United States Patent
Hinckley et al.

(10) Patent No.: US 10,168,827 B2
(45) Date of Patent: ***Jan. 1, 2019

(54) SENSOR CORRELATION FOR PEN AND TOUCH-SENSITIVE COMPUTING DEVICE INTERACTION

(71) Applicant: Microsoft Technology Licensing, LLC, Redmond, WA (US)

(72) Inventors: Ken Hinckley, Redmond, WA (US); Hrvoje Benko, Seattle, WA (US); Michel Pahud, Kirkland, WA (US); Andrew D. Wilson, Seattle, WA (US); Pourang Polad Irani, Winnipeg (CA); Francois Guimbretiere, Ithaca, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,507

(22) Filed: Jul. 1, 2017

(65) Prior Publication Data
US 2017/0300170 A1 Oct. 19, 2017

Related U.S. Application Data

(63) Continuation of application No. 14/303,203, filed on Jun. 12, 2014, now Pat. No. 9,727,161.

(51) Int. Cl.
*G06F 3/041* (2006.01)
*G06F 3/0487* (2013.01)
(Continued)

(52) U.S. Cl.
CPC .......... *G06F 3/0416* (2013.01); *G06F 3/0383* (2013.01); *G06F 3/03545* (2013.01);
(Continued)

(58) Field of Classification Search
CPC .. G06F 3/0416; G06F 3/0383; G06F 3/04883; G06F 3/03545; G06F 3/0482
(Continued)

(56) References Cited

U.S. PATENT DOCUMENTS

5,149,919 A  9/1992  Greenies et al.
5,198,623 A  3/1993  Landmeier
(Continued)

FOREIGN PATENT DOCUMENTS

KR  10-2012-0005417 A1  1/2012
WO  2009084809 A1  7/2012
WO  2013054155 A1  4/2013

OTHER PUBLICATIONS

Aliakseyeu, D., A. Lucero, S. Subramanian, Interacting with piles of artifacts on digital tables, Digital Creativity, Jul. 2007, pp. 161-174, vol. 18, No. 3.

(Continued)

*Primary Examiner* — Michael Pervan
(74) *Attorney, Agent, or Firm* — Alleman Hall Creasman & Tuttle LLP

(57) ABSTRACT

Pen and computing device sensor correlation technique embodiments correlate sensor signals received from various grips on a touch-sensitive pen and touches to a touch-sensitive computing device in order to determine the context of such grips and touches and to issue context-appropriate commands to the touch sensitive pen or the touch-sensitive computing device. A combination of concurrent sensor inputs received from both a touch-sensitive pen and a touch-sensitive computing device are correlated. How the touch-sensitive pen and the touch-sensitive computing device are touched or gripped are used to determine the context of their use and the user's intent. A context-appro- (Continued)

priate user interface action based can then be initiated. Also the context can be used to label metadata.

19 Claims, 14 Drawing Sheets

(51) Int. Cl.
  *G06F 3/0488* (2013.01)
  *G06F 3/0354* (2013.01)
  *G06F 3/038* (2013.01)
  *G06F 3/0482* (2013.01)

(52) U.S. Cl.
  CPC .......... *G06F 3/0482* (2013.01); *G06F 3/0487* (2013.01); *G06F 3/04883* (2013.01); *G06F 2203/04104* (2013.01); *G06F 2203/04808* (2013.01)

(58) Field of Classification Search
  USPC ................. 178/18.01–19.07; 345/173–183
  See application file for complete search history.

(56) References Cited

U.S. PATENT DOCUMENTS

| | | |
|---|---|---|
| 5,414,227 A | 5/1995 | Schubert et al. |
| 5,463,725 A | 10/1995 | Henckel et al. |
| 5,625,833 A | 4/1997 | Levine et al. |
| 5,778,404 A | 7/1998 | Capps et al. |
| 5,867,163 A | 2/1999 | Kurtenbach |
| 5,914,701 A | 6/1999 | Gercheneld et al. |
| 5,956,020 A | 9/1999 | D'Amico et al. |
| 6,307,548 B1 | 10/2001 | Flinchem et al. |
| 6,788,292 B1 | 9/2004 | Nako et al. |
| 6,906,703 B2 | 6/2005 | Vablais et al. |
| 7,231,609 B2 | 6/2007 | Baudisch |
| 7,289,102 B2 | 10/2007 | Hinckley et al. |
| 7,362,221 B2 | 4/2008 | Katz |
| 7,400,316 B2 | 7/2008 | Appleyard et al. |
| 7,499,024 B2 | 3/2009 | Johnston, Jr. et al. |
| 7,532,196 B2 | 5/2009 | Hinckley |
| 7,567,242 B2 | 7/2009 | Perkins et al. |
| 7,703,047 B2 | 4/2010 | Keely, Jr. et al. |
| 7,812,826 B2 | 10/2010 | Ording et al. |
| 7,812,828 B2 | 10/2010 | Westerman et al. |
| 7,847,789 B2 | 12/2010 | Kolmykov-Zotov et al. |
| 7,956,847 B2 | 6/2011 | Christie |
| 7,982,739 B2 | 7/2011 | Pasula |
| 8,228,292 B1 | 7/2012 | Ruiz et al. |
| 8,265,705 B2 | 9/2012 | Lee |
| 8,360,669 B2 | 1/2013 | Underwood et al. |
| 8,413,077 B2 | 4/2013 | Yamamoto et al. |
| 8,660,978 B2 | 2/2014 | Hinckley et al. |
| 8,982,045 B2 | 3/2015 | Hinckley et al. |
| 8,988,398 B2 | 3/2015 | Cao et al. |
| 9,244,545 B2 | 1/2016 | Hinckley et al. |
| 2003/0076310 A1 | 4/2003 | Kanzaki et al. |
| 2003/0164821 A1 | 9/2003 | Rezania |
| 2004/0012575 A1 | 1/2004 | Homer et al. |
| 2004/0047505 A1 | 3/2004 | Ghassabian |
| 2004/0073432 A1 | 4/2004 | Stone |
| 2004/0140962 A1 | 7/2004 | Wang et al. |
| 2004/0189594 A1 | 9/2004 | Sterling |
| 2004/0203520 A1 | 10/2004 | Schirtzinger et al. |
| 2005/0024346 A1 | 2/2005 | Dupraz et al. |
| 2005/0052427 A1 | 3/2005 | Wu et al. |
| 2005/0079896 A1 | 4/2005 | Kokko et al. |
| 2005/0165839 A1 | 7/2005 | Madan et al. |
| 2005/0179648 A1 | 8/2005 | Barabe et al. |
| 2005/0216867 A1 | 9/2005 | Marvit et al. |
| 2005/0253817 A1 | 11/2005 | Rytivaara et al. |
| 2006/0026535 A1 | 2/2006 | Hotelling et al. |
| 2006/0109252 A1 | 5/2006 | Kolmykov-Zotov et al. |
| 2006/0136840 A1 | 6/2006 | Keely, Jr. et al. |
| 2006/0012580 A1 | 7/2006 | Perski et al. |
| 2006/0146038 A1 | 7/2006 | Park et al. |
| 2006/0177112 A1 | 8/2006 | Yang et al. |
| 2006/0197750 A1 | 9/2006 | Kerr et al. |
| 2006/0197753 A1 | 9/2006 | Hotelling |
| 2006/0256008 A1 | 11/2006 | Rosenberg |
| 2006/0267957 A1 | 11/2006 | Kolmykov-Zotov et al. |
| 2006/0267958 A1 | 11/2006 | Kolmykov-Zotov et al. |
| 2007/0002016 A1 | 1/2007 | Cho et al. |
| 2007/0070051 A1 | 3/2007 | Westerman et al. |
| 2007/0075965 A1 | 4/2007 | Huppi et al. |
| 2007/0113198 A1 | 5/2007 | Robertson et al. |
| 2007/0126732 A1 | 6/2007 | Robertson et al. |
| 2007/0152976 A1 | 7/2007 | Townsend et al. |
| 2007/0182663 A1 | 8/2007 | Biech |
| 2007/0188477 A1 | 8/2007 | Rehm |
| 2007/0198950 A1 | 8/2007 | Dodge et al. |
| 2007/0247441 A1 | 10/2007 | Kim et al. |
| 2007/0268274 A1 | 11/2007 | Westerman et al. |
| 2008/0002888 A1 | 1/2008 | Yuan |
| 2008/0012835 A1 | 1/2008 | Rimon et al. |
| 2008/0040692 A1 | 2/2008 | Sunday et al. |
| 2008/0046425 A1 | 2/2008 | Perski |
| 2008/0055278 A1 | 3/2008 | Locker et al. |
| 2008/0106520 A1 | 5/2008 | Free et al. |
| 2008/0158145 A1 | 7/2008 | Westerman |
| 2008/0158168 A1 | 7/2008 | Westerman et al. |
| 2008/0163130 A1 | 7/2008 | Westerman |
| 2008/0191898 A1 | 8/2008 | Janik |
| 2008/0259043 A1 | 10/2008 | Buil et al. |
| 2008/0292195 A1 | 11/2008 | Vijayasenan et al. |
| 2009/0066663 A1 | 3/2009 | Chang et al. |
| 2009/0073144 A1 | 3/2009 | Chen et al. |
| 2009/0083847 A1 | 3/2009 | Fadell et al. |
| 2009/0100384 A1 | 4/2009 | Louch |
| 2009/0109182 A1 | 4/2009 | Fyke et al. |
| 2009/0153525 A1 | 6/2009 | Chang |
| 2009/0160816 A1 | 6/2009 | Westerman et al. |
| 2009/0167702 A1 | 7/2009 | Numi |
| 2009/0178007 A1 | 7/2009 | Matas et al. |
| 2009/0209285 A1 | 8/2009 | McMahan |
| 2009/0228842 A1 | 9/2009 | Westerman et al. |
| 2009/0259969 A1 | 10/2009 | Pallakoff |
| 2009/0262074 A1 | 10/2009 | Nasiri et al. |
| 2009/0265671 A1 | 10/2009 | Sachs et al. |
| 2009/0267896 A1 | 10/2009 | Hiramatsu |
| 2010/0007618 A1 | 1/2010 | Park et al. |
| 2010/0020025 A1 | 1/2010 | Lemort et al. |
| 2010/0045705 A1 | 2/2010 | Vertegaal et al. |
| 2010/0053095 A1 | 3/2010 | Wu et al. |
| 2010/0053120 A1 | 3/2010 | Chang et al. |
| 2010/0079493 A1 | 4/2010 | Tse et al. |
| 2010/0083191 A1 | 4/2010 | Marshall |
| 2010/0085317 A1 | 4/2010 | Park |
| 2010/0095234 A1 | 4/2010 | Lane et al. |
| 2010/0103117 A1 | 4/2010 | Townsend et al. |
| 2010/0103118 A1 | 4/2010 | Townsend et al. |
| 2010/0123737 A1 | 5/2010 | Williamson et al. |
| 2010/0127979 A1 | 5/2010 | Lee et al. |
| 2010/0139990 A1 | 6/2010 | Westerman et al. |
| 2010/0156941 A1 | 6/2010 | Seung |
| 2010/0175018 A1 | 7/2010 | Petschnigg et al. |
| 2010/0177121 A1 | 7/2010 | Homma et al. |
| 2010/0188328 A1 | 7/2010 | Dodge et al. |
| 2010/0194547 A1 | 8/2010 | Terrell et al. |
| 2010/0214216 A1 | 8/2010 | Nasiri et al. |
| 2010/0235729 A1 | 9/2010 | Kociendaq et al. |
| 2010/0281435 A1 | 11/2010 | Bangalore et al. |
| 2010/0295781 A1 | 11/2010 | Alameh et al. |
| 2010/0295799 A1 | 11/2010 | Nicholson et al. |
| 2010/0298033 A1 | 11/2010 | Lee |
| 2010/0306670 A1 | 12/2010 | Quinn et al. |
| 2010/0328227 A1 | 12/2010 | Matejka et al. |
| 2011/0115741 A1 | 5/2011 | Lukas et al. |
| 2011/0134026 A1 | 6/2011 | Kang et al. |
| 2011/0163955 A1 | 7/2011 | Nasiri et al. |
| 2011/0167357 A1 | 7/2011 | Benjamin et al. |
| 2011/0187651 A1 | 8/2011 | Whitlow et al. |
| 2011/0193788 A1 | 8/2011 | King et al. |

(56) References Cited

U.S. PATENT DOCUMENTS

| | | |
|---|---|---|
| 2011/0197153 A1 | 8/2011 | King et al. |
| 2011/0221777 A1 | 9/2011 | Ke |
| 2011/0231796 A1 | 9/2011 | Vigil |
| 2011/0239110 A1 | 9/2011 | Garrett et al. |
| 2012/0092268 A1 | 4/2012 | Tsai et al. |
| 2012/0092269 A1 | 4/2012 | Tsai et al. |
| 2012/0154293 A1 | 6/2012 | Hinckley et al. |
| 2012/0154294 A1 | 6/2012 | Hinckley et al. |
| 2012/0154295 A1 | 6/2012 | Hinckley et al. |
| 2012/0154296 A1 | 6/2012 | Hinckley et al. |
| 2012/0158629 A1 | 6/2012 | Hinckley et al. |
| 2012/0206330 A1 | 8/2012 | Cao et al. |
| 2012/0235904 A1 | 9/2012 | Plagemann |
| 2012/0242598 A1 | 9/2012 | Won et al. |
| 2012/0260220 A1 | 10/2012 | Griffin |
| 2012/0262407 A1 | 10/2012 | Hinckley et al. |
| 2012/0306927 A1 | 12/2012 | Lee et al. |
| 2012/0313865 A1 | 12/2012 | Pearce |
| 2012/0327040 A1 | 12/2012 | Simon et al. |
| 2012/0327042 A1 | 12/2012 | Harley et al. |
| 2012/0331546 A1 | 12/2012 | Falkenburg et al. |
| 2013/0016055 A1 | 1/2013 | Chuang |
| 2013/0106725 A1 | 5/2013 | Bakken et al. |
| 2013/0106740 A1 | 5/2013 | Yilmaz et al. |
| 2013/0106777 A1 | 5/2013 | Yilmaz et al. |
| 2013/0120281 A1 | 5/2013 | Harris |
| 2013/0159939 A1 | 6/2013 | Krishnamurthi |
| 2013/0154952 A1 | 7/2013 | Hinckley et al. |
| 2013/0181902 A1 | 7/2013 | Hinckley et al. |
| 2013/0181948 A1 | 7/2013 | Sakai |
| 2013/0201113 A1 | 8/2013 | Hinckley et al. |
| 2013/0257777 A1 | 10/2013 | Banks et al. |
| 2013/0335333 A1 | 12/2013 | Kukulski et al. |
| 2014/0073432 A1 | 3/2014 | Lu et al. |
| 2014/0078117 A1 | 3/2014 | Asano |
| 2014/0104211 A1 | 4/2014 | Harris |
| 2014/0108979 A1 | 4/2014 | Davidson et al. |
| 2014/0210797 A1 | 7/2014 | Kreek et al. |
| 2014/0253522 A1 | 9/2014 | Cueto |
| 2014/0267025 A1 | 9/2014 | Kim |

OTHER PUBLICATIONS

Balakrishnan, et al., Digital tape drawing, Proceedings of the 12th Annual ACM Symposium on User Interface Software and Technology, ACM Symposium on User Interface Software and Technology, UIST '99, Nov. 7-10, 1999, pp. 161-169, Asheville, USA.

Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.

Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.

Buxton, William A.S., "A Three-State Model of Graphical Input", In Proceedings of the IFIP TC13 Third Interational Conference on Human-Computer Interaction, Aug. 27, 1990, 11 pages.

Card, S. K., J. D. Mackinlay, G. G. Robertson, The design space of input devices, CHI 1990, Apr. 1990, pp. 117-124, Seattle, WA, USA.

Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.

Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.

Fitzmaurice, et al., "Tracking Menus", In Proceedings of the 16th Annual ACM Symposium on User Interface Software and Technology, Nov. 2, 2003, 10 pages.

Goel, et al., "WalkType: Using Accelerometer Data to Accomodate Situational Impairments in Mobile Touch Screen Text Entry", In Proceedings of the SIGCHI Conference on Human Factors in Computing Systems, May 5, 2012, 10 pages.

Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.

Hinckley, et al., "Touch-Sensing Input Devices", In Proceedings of the SIGCHI Conference on Human Factors in Computing Systems, May 15, 1999, 8 pages.

Kurtenbach, et al., "Issues in Combining Marking and Direct Manipulation Techniques", In Proceedings of the 4th Annual ACM Symposium on User Interface Software and Technology, Nov. 11, 1991, 8 pages.

Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.

Li, et al., "Experimental Analysis of Mode Switching Techniques in Pen-Based User Interfaces", In Proceedings of the SIGCHI Conference on Human Factors in Computing Systems, Apr. 2, 2005, 10 pages.

Li, et al., "The 1Line Keyboard: A QWERTY Layout in a Single Line", In Proceedings of the 24th Annual ACM Symposium on User Interface Software and Technology, Oct. 16, 2011, 10 pages.

Ramos, et al., "Pressure Widgets", In Proceedings of the SIGCHI Conference on Human Factors in Computing Systems, vol. 6, Issue 1, Apr. 24, 2004, 8 pages.

Ramos, et al., "Tumble! Splat! Helping Users Access and Manipulate Occluded Content in 2D Drawings", In Proceedings of the Working Conference on Advanced Visual Interfaces, May 23, 2006, 8 pages.

Rekimoto, Jun, "Tilting Operations for Small Screen Interfaces", In Proceedings of the 9th Annual ACM Symposium on User Interface Software and Technology, Nov. 6, 1996, 2 pages.

Ruiz, et al., "DoubleFlip: A Motion Gesture Delimiter for Mobile Interaction", In Proceedings of the SIGCHI Conference on Human Factors in Computing Systems, May 7, 2011, 4 pages.

Sachs, et al., "3-Draw: A Tool for Designing 3D Shapes", In Journal of IEEE Computer Graphics and Applications, vol. 11, Issue 6, Nov. 1991, 9 pages.

Subramanian, et al., "Multi-layer interaction for digital tables," In Proc. of the 19th Annual ACM Symposium on User Interface Software and Technology, Oct. 15, 2006, pp. 269-272.

Tashman, et al., "LiquidText: A Flexible, Multitouch Environment to Support Active Reading", In Proceedings of the SIGCHI Conference on Human Factors in Computing Systems, May 7, 2011, 10 pages.

Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.

Verplaetse, C., "Inertial Proprioceptive Devices: Self-Motion-Sensing Toys and Tools", In IBM Systems Journal, vol. 35, Issue 3-4, Apr. 23, 2013, 12 pages.

Wilson et al., "XWand: UI for Intelligent Spaces", Proc. of the 2003 Conf. on Human Factors in Computing Sys's, CHI 2003, Apr. 5-10, 2003, pp. 545-552, Ft. Lauderdale, Florida, USA.

Wu et al., "Gesture Registration, Relaxation, and Reuse for Multi-Point Direct-Touch Surfaces", First IEEE Int'l Workshop on Horizontal Interactive Human-Comp. Sys's, Tabletop 2006, Jan. 2006, pp. 185-192, Adelaide, Australia.

Xin et al., "Acquiring and Pointing: An Empirical Study of Pen-tilt-based Interaction", Proc. of the Int'l Conf. on Human Factors in Computing Sys's, CHI 2011, May 7-12, 2011, pp. 849-858, Vancouver, BC, Canada.

Zeleznik et al., "Hands-on Math: A Page-based Multi-touch and Pen Desktop for Technical Work and Problem Solving", Proc. of the 23rd Annual ACM Symposium on User Interface Software and Tech., Oct. 3-6, 2010, pp. 17-26, New York, NY, USA.

(56) References Cited

OTHER PUBLICATIONS

Joselli et al., "GRMOBILE—A Framework for touch and accelerometer gesture recognition for mobile", Proceedings of the 2009 VIII Brazilian Symposium on Games and Digital Entertainment, Oct. 2009, pp. 141-150.
Joshi, et al., "Image Deblurring Using Inertial Measurement Sensors," retrieved at <<http://acm.org>>, ACM Transactions on Graphics, vol. 29, No. 4, Article 30, Jul. 2010, 9 pages.
Kendrick, "ChromeTouch: Free Extension for Touch Tables", GigaOM, May 6, 2010, 9 pages.
Kim, et al., "Hand Grip Pattern Recognition for Mobile User Interfaces", In Proceedings of the 18th Conference on Innovative Applications of Artificial Intelligence, vol. 2, Jul. 16, 2006, 6 pages.
Kratz, et al., "Unravelling Seams: Improving Mobile Gesture Recognition with Visual Feedback Techniques," retrieved at <<http://acm.org>>, CHI '09 Proceedings of the 27th International Conference on Human Factors in Computing Systems, Apr. 2009, pp. 937-940.
Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.
Lester, et al., ""Are You With Me?"—Using Accelerometers to Determine if Two Devices are Carried by the Same Person", In Proceedings of Second International Conference on Pervasive Computing, Apr. 21, 2004, 18 pages.
Liao, et al., "PACER: Fine-grained Interactive Paper via Camera-touch Hybrid Gestures on a Cell Phone," retrieved at <<http://acm.org>>, CHI '10 Proceedings of the 28th International Conference on Human Factors in Computing Systems, Apr. 2010, pp. 2441-2450.
Liu, et al., "FlexAura: A Flexible Near-Surface Range Sensor", 25th Annual ACM Symposium on User Interface Software and Technology, UIST '12, Oct. 7-10, 2012, pp. 327-330, Cambridge, MA, USA.
Luff, et al., "Mobility in Collaboration", Proceedings of the ACM 1998 Conference on Computer Supported Cooperative Work, CSCW 1998, Nov. 14-18, 1998, pp. 305-314, Seattle, WA, USA.
Mahony, et al., "Nonlinear Complementary Filters on the Special Orthogonal Group", IEEE Trans. Automat. Contr., 2008, pp. 1203-1218, vol. 53, No. 5.
Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.
Marquardt, et al., "Cross-Device Interaction Via Micro-Mobility and F-formations", 25th Annual ACM Symposium on User Interface Software and Technology, UIST '12, Oct. 7-10, 2012, pp. 13-22, Cambridge, MA, USA.
Mason, et al., "Grip Forces When Passing an Object to a Partner", Exp. Brain Res., May 2005, vol. 163, No. 2, pp. 173-187.
Matulic, et al., Supporting Active Reading on Pen and Touch-operated Tabletops, Proc. of the Int'l Working Conf. on Advanced Visual Interfaces, AVI 2012, May 22-25, 2012, pp. 612-619, Capri Island, Naples, Italy.
Mohamed, et al., "Disoriented Pen-Gestures for Identifying Users Around the Tabletop Without Cameras and Motion Sensors", Proceedings of the First IEEE International Workshop on Horizontal Interactive Human-Computer Systems (Tabletop '06), Jan. 2006, 8 pages.
Moleskine SpA, "Moleskine Journal on the App Store on iTunes", https://itunes.apple.com/us/app/moleskine-journal/id550926297, retrieved Jun. 20, 2014, pp. 1-3.
Mulroy, "N-Trig Pushes Pen and Multitouch Input", PC World, retrieved on Jan. 27, 2011 at <<http://www.pcworld.com/article/196723/ntrig_pushes_pen_and_multitouch_input.html>>, May 19, 2010, 3 pages.
"N-act Multi-Touch Gesture Vocabulary Set", retrieved date, Oct. 12, 2011, 1 page.

Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, Nov. 2003, pp. 44-51.
Partridge, et al., "TiltType: Accelerometer-Supported Text Entry for Very Small Devices," retrieved at <<http://acm.org>>, UIST '02 Proceedings of the 15th Annual ACM Symposium on User Interface Software and Technology, Oct. 2002, pp. 201-204.
"PenLab: Itronix GoBook Duo-Touch," retrieved at <<http://pencomputing.com/frames/itronix_duotouch.html>>, retrieved on Jan. 31, 2012, Pen Computing Magazine, 3 pages.
Evernote Corp., "Penultimate on the App Store on iTunes", https://itunes.apple.com/us/app/id354098826?mt=8, retrieved Jun. 20, 2014, pp. 1-3.
Premerlani, et al., "Direction Cosine Matrix IMU: Theory", retrieved from gentlenav.googlecode.com/files/DCMDraft2.pdf, May 2009, pp. 1-30.
Rahman, et al., "Tilt Techniques: Investigating the Dexterity of Wrist-based Input," retrieved at <<http://acm.org>>, CHI '09 Proceedings of the 27th international Conference on Human Factors in Computing Systems, Apr. 2009, pp. 1943-1952.
Rekimoto, J., Pick-and-drop: A direct manipulation technique for multiple computer environments, Conference on Human Factors in Computing Systems, CHI 2000, Apr. 1, 2000, The Hague, The Netherlands.
Rofouei, et al., "Your Phone or Mine? Fusing Body, Touch and Device Sensing for Multi-User Device-Display Interaction", In Proceedings of the SIGCHI Conference on Human Factors in Computing Systems, May 5, 2012, 4 pages.
Roudaut, et al., "TimeTilt: Using Sensor-Based Gestures to Travel through Multiple Applications on a Mobile Device", In Proceedings of the 12th IFIP TC 13 International Conference on Human-Computer Interaction: Part I, Aug. 24, 2009, 5 pages.
Ruiz, et al., "User-Defined Motion Gestures for Mobile Interaction", In Proceedings of the SIGCHI Conference on Human Factors in Computing Systems, May 7, 2011, 10 pages.
"Samsung Exhibit II 4G review: Second time around," retrieved at <<http://www.gsmarena.com/samsung_exhibit_2_4g-review-685p5.php>>, GSMArena.com, Dec. 1, 2011, p. 5 of online article, 3 pages.
Savov, S., "Samsung Galaxy S II shows off motion-zoom option in TouchWiz 4.0 (video)", Engadget, Mar. 29, 2011, 3 pages.
Schmidt, et al., "Advanced Interaction in Context", In Proceedings of the 1st International Symposium on Handheld and Ubiquitous Computing, Sep. 27, 1999, 13 pages.
Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.
Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.
Schwartz, et al., "Probabilistic Palm Rejection Using Spatiotemporal Touch Features and Iterative Classification", CHI Conf. on Human Factors in Computing Systems, CHI 2014, Apr. 26-May 1, 2014, pp. 2009-2012, Toronto, ON, Canada.
Schwesig, et al., "Gummi: A Bendable Computer," retrieved at <<http://acm.org>>, CHI '04, Proceedings of the SIGCHI Conference on Human Factors in Computing Systems, Apr. 2004, pp. 263-270.
Sellen, et al., "The Prevention of Mode Errors through Sensory Feedback," retrieved at <<http://acm.org>>, Journal of Human-Computer Interaction, vol. 7, Issue 2, Jun. 1992, pp. 141-164.
Shanklin, "[Video] New HTC Flyer Hands-on Shows Stylus' 'Palm Rejection' in Action", Mar. 4, 2011, 5 pages.
Siio et al., "Mobile Interaction Using Paperweight Metaphor", Proc. of the 19th Annual ACM Symposium on User Interface Software and Technology, UIST '06, Oct. 2006, pp. 111-114, Montreux, Switzerland.
Song et al., "Grips and Gestures on a Multi-Touch Pen", Proc. of the Int'l Conf. on Human Factors in Computing Sys's, CHI 2011, May 7-12, 2011, pp. 1323-1332, Vancouver, BC, Canada.

(56) References Cited

OTHER PUBLICATIONS

Song et al., "WYSIWYF: Exploring and Annotating Volume Data with a Tangible Handheld Device", Proc. of the Int'l Conf. on Human Factors in Computing Sys's, CHI 2011, Vancouver, BC, Canada, May 7-12, 2011.
Sun, et al., "Enhancing Naturalness of Pen-and-Tablet Drawing through Context Sensing", In Proceedings of the ACM International Conference on Interactive Tabletops and Surfaces, Nov. 13, 2011, 4 pages.
Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.
Taylor, et al., "Graspables: Grasp-Recognition as a User Interface", In Proceedings of the 27th International Conference on Human Factors in Computing Systems, Apr. 4, 2008, 9 pages.
Thurrott, Paul, "Windows XP Tablet PC Edition reviewed", Paul Thurrott's Supersite for Windows, Jun. 25, 2002, 7 pages.
Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.
"TouchPaint.java", The Android Open Source Project, 2007.
"Using Windows Flip 3D", retrieved at <<http://windows.microsoft.com/en-US/windows-vista/Using-Windows-Flip-3D>>, retrieved on Feb. 9, 2012, Microsoft Corporation, Redmond, WA, 1 page.
Vogel, et al., "Conte: Multimodal Input Inspired by an Artist's Crayon", In Proceedings of the 24th Annual ACM Symposium on User Interface Software and Technology, Oct. 16, 2011, 10 pages.
Wagner et al., "BiTouch and BiPad: Designing Bimanual Interaction for Hand-held Tablets", CHI Conf. on Human Factors in Computing Systems, CHI '12, May 5-10, 2012, pp. 2317-2326, Austin, TX, USA.
Walker, Geoff, "Palm rejection on resistive touchscreens", Veritas et Visus, Nov. 2005, pp. 31-33.
Wigdor, et al., "Lucid-Touch: A See-through Mobile Device," Proceedings of the 20th Annual ACM Symposium on User Interface Software and Technology, Oct. 2007, pp. 269-278.
Wigdor, et al., "TiltText:Using Tilt for Text Input to Mobile Phones," retrieved at <<http://acm.org>>, UIST '03, Proceedings of the 16th Annual ACM Symposium on User Interface Software and Technology, Nov. 2003, pp. 81-90.
"Williamson, et al., "Shoogle: Excitatory Multimodal Interaction on Mobile Devices," retrieved at <<http://acm.org>>, CHI '07, Proceedings of the SIGCHI Conference on Human factors in Computing Systems, Apr. 2007, pp. 121-124."
Wimmer et al., "HandSense: Discriminating Different Ways of Grasping and Holding a Tangible User Interface", Proc. of the 3rd Int'l Conf. on Tangible and Embedded Interaction, TEI '09, Feb. 2009, pp. 359-362.
Xin et al.,"Natural Use Profiles for the Pen: An Empirical Exploration of Pressure, Tilt, and Azimuth", CHI Conf. on Human Factors in Computing Sys's, CHI '12, May 5-10, 2012, pp. 801-804, Austin, TX, USA.
Yee, "Two-handed interaction on a tablet display", Extended Abstracts of the 2004 Conf. on Human Factors in Computing Sys's, CHI Extended Abstracts 2004, Apr. 24-29, 2004, pp. 1493-1496, Vienna, Austria.
Yoon et al., "TextTearing: Opening White Space for Digital Ink Annotation", The 26th Annual ACM Symposium on User Interface Software and Tech., UIST'13, St. Andrews, United Kingdom, Oct. 8-11, 2013, pp. 107-112.
Zhou, Hong, U.S. Office Action, U.S. Appl. No. 13/903,944, dated Mar. 27, 2015, pp. 1-23.
Zhou, Hong, U.S. Notice of Allowance, U.S. Appl. No. 13/903,944, dated Jul. 20, 2015, pp. 1-5.
Zhou, Hong, U.S. Notice of Allowance, U.S. Appl. No. 13/903,944, dated Aug. 3, 2015, pp. 1-2.
Traktovenko, Ilya, U.S. Office Action, U.S. Appl. No. 13/530,015, dated Jul. 18, 2014, pp. 1-26.
Traktovenko, Ilya, U.S. Final Office Action, U.S. Appl. No. 13/530,015, dated Nov. 19, 2014, pp. 1-48.
Traktovenko, Ilya, U.S. Office Action, U.S. Appl. No. 13/530,015, dated Apr. 28, 2015, pp. 1-32.
Figueroa-Gibson, Gloryvid, U.S. Office Action, U.S. Appl. No. 12/970,949, dated Mar. 13, 2014, pp. 1-29.
Figueroa-Gibson, Gloryvid, U.S. Final Office Action, U.S. Appl. No. 12/970,949, dated Nov. 29, 2013, pp. 1-24.
Figueroa-Gibson, Gloryvid, U.S. Office Action, U.S. Appl. No. 12/970,949, dated Jun. 21, 2013, pp. 1-20.
Figueroa-Gibson, Gloryvid, U.S. Final Office Action, U.S. Appl. No. 12/970,949, dated Aug. 15, 2014, pp. 1-21.
Figueroa-Gibson, Gloryvid, U.S. Office Action, U.S. Appl. No. 12/970,949, dated Jan. 2, 2015, pp. 1-24.
Figueroa-Gibson, Gloryvid, U.S. Final Office Action, U.S. Appl. No. 12/970,949, dated Jun. 10, 2015, pp. 1-25.
Figueroa-Gibson, Gloryvid, U.S. Final Office Action, U.S. Appl. No. 12/970,943, dated Nov. 6, 2013, pp. 1-19.
Figueroa-Gibson, Gloryvid, U.S. Office Action, U.S. Appl. No. 12/970,943, dated Jun. 10, 2013, pp. 1-21.
Figueroa-Gibson, Gloryvid, U.S. Office Action, U.S. Appl. No. 12/970,943, dated Mar. 13, 2014, pp. 1-25.
Figueroa-Gibson, Gloryvid, U.S. Office Action, U.S. Appl. No. 12/970,943, dated Sep. 17, 2014, pp. 1-20.
Figueroa-Gibson, Gloryvid, U.S. Notice of Allowance, U.S. Appl. No. 12/970,943, dated Dec. 19, 2014, pp. 1-10.
Traktovenko, Ilya, U.S. Notice of Allowance, U.S. Appl. No. 12/970,945, dated Oct. 16, 2013, pp. 1-7.
Traktovenko, Ilya, U.S. Notice of Allowance, U.S. Appl. No. 12/970,945, dated Jul. 10, 2013, pp. 1-13.
Traktovenko, Ilya, U.S. Office Action, U.S. Appl. No. 12/970,945, dated Apr. 22, 2013, pp. 1-17.
Figueroa-Gibson, Gloryvid, U.S. Office Action, U.S. Appl. No. 12/970,939, dated Dec. 19, 2013, pp. 1-28.
Figueroa-Gibson, Gloryvid, U.S. Office Action, U.S. Appl. No. 12/970,939, dated Jun. 5, 2013, pp. 1-26.
Figueroa-Gibson, Gloryvid, U.S. Final Office Action, U.S. Appl. No. 12/970,939, dated Aug. 22, 2013, pp. 1-19.
Figueroa-Gibson, Gloryvid, U.S. Final Office Action, U.S. Appl. No. 12/970,939, dated May 30, 2014, pp. 1-32.
Figueroa-Gibson, Gloryvid, U.S. Office Action, U.S. Appl. No. 12/970,939, dated Oct. 2, 2014, pp. 1-40.
Figueroa-Gibson, Gloryvid, U.S. Notice of Allowance, U.S. Appl. No. 12/970,939, dated Dec. 19, 2014, pp. 1-10.
Zhou, Hong, U.S. Office Action, U.S. Appl. No. 13/026,058, dated Aug. 29, 2013, pp. 1-12.
Zhou, Hong, U.S. Final Office Action, U.S. Appl. No. 13/026,058, dated Feb. 26, 2014, pp. 1-14.
Zhou, Hong, Notice of Allowance, U.S. Appl. No. 13/026,058, dated Jul. 17, 2014, pp. 1-5.
Zhou, Hong, Notice of Allowance, U.S. Appl. No. 13/026,058, dated Nov. 7, 2014, pp. 1-5.
Treitler, Damon, U.S. Final Office Action, U.S. Appl. No. 13/327,794, dated Dec. 19, 2013, pp. 1-16.
Treitler, Damon, U.S. Office Action, U.S. Appl. No. 13/327,794, dated Aug. 16, 2013, pp. 1-16.
Treitler, Damon, U.S. Office Action, U.S. Appl. No. 13/327,794, dated Jul. 17, 2014, pp. 1-13.
Treitler, Damon, U.S. Final Office Action, U.S. Appl. No. 13/327,794, dated Nov. 20, 2014, pp. 1-13.
Davis, David D., U.S. Office Action, U.S. Appl. No. 13/327,794, dated Mar. 11, 2016, pp. 1-15.
Davis, David D., U.S. Final Office Action, U.S. Appl. No. 13/327,794, dated Nov. 8, 2016, pp. 1-16.
Geisy, Adam, U.S. Office Action, U.S. Appl. No. 13/367,377, dated Feb. 13, 2014, pp. 1-11.
Geisy, Adam, U.S. Final Office Action, U.S. Appl. No. 13/367,377, dated Jul. 1, 2014, pp. 1-12.
Geisy, Adam, Notice of Allowance, U.S. Appl. No. 13/367,377, dated Oct. 27, 2014, pp. 1-10.
Pervan, Michael, U.S. Office Action, U.S. Appl. No. 14/303,203, dated Mar. 1, 2016, pp. 1-11.

(56) References Cited

OTHER PUBLICATIONS

Pervan, Michael, U.S. Final Office Action, U.S. Appl. No. 14/303,203, dated Jul. 26, 2016, pp. 1-7.
Pervan, Michael, U.S. Office Action, U.S. Appl. No. 14/303,203, dated Nov. 2, 2016, pp. 1-7.
Pervan, Michael, U.S. Notice of Allowance, U.S. Appl. No. 14/303,203, dated May 1, 2017, pp. 1-7.
McLoone, Peter D., U.S. Office Action, U.S. Appl. No. 14/303,234, dated Oct. 15, 2015, pp. 1-16.
McLoone, Peter D., U.S. Final Office Action, U.S. Appl. No. 14/303,234, dated Mar. 28, 2016, pp. 1-16.
McLoone, Peter D., U.S. Office Action, U.S. Appl. No. 14/303,234, dated Jun. 16, 2016, pp. 1-17.
McLoone, Peter D., U.S. Office Action, U.S. Appl. No. 14/303,234, dated Dec. 8, 2016, pp. 1-16.
McLoone, Peter D., U.S. Office Action, U.S. Appl. No. 14/303,234, dated Mar. 21, 2017, pp. 1-13.
Seifert, J., Written opinion of the International Preliminary Examining Authority, PCT/US2015/034613, dated Apr. 20, 2016, pp. 1-10.
Ernst, M., Written opinion of the International Preliminary Examining Authority, PCT/US2015/034612, dated May 18, 2016, pp. 1-5.
Annett, M., F. Anderson, W. F. Bischof, A. Gupta, The pen is mightier: Understanding stylus behaviour while inking on tablets, Graphics Interface 2014, GI '14, May 7-9, 2014, pp. 193-200, Montreal, QC, Canada.
Ashbrook, et al., "Magic: A Motion Gesture Design Tool," retrieved at <<http://research.nokia.com/files/2010-Ashbrook-CHI10-MAGIC.pdf>>, Proceedings of the 28th International Conference on Human Factors in Computing Systems, Apr. 2010, 10 pages.
Babyak, Richard, "Controls & Sensors: Touch Tones", retrieved at <<http://www.appliancedesign.com/Articles/Controls_and_Displays/BNP_GUID_9-5-2006_A_10000000000000129366>>, Appliance Design, Jun. 30, 2007, 5 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.
Bartlett, Joel F., "Rock 'n' Scroll is Here to Stay," accessed at <<http://www.hpl.hp.com/techreports/Compaq-DEC/WRL-2000-3.pdf>>, Western Research Laboratory, Palo Alto, California, May 2000, 9 pages.
Becchio, et al., "Grasping Intentions: From Thought Experiments to Empirical Evidence", Frontiers in Human Neuroscience, May 2012, vol. 6, pp. 1-6.
Bi, et al., "An Exploration of Pen Rolling for Pen-Based Interaction", In Proceedings of the 21st Annual ACM Symposium on User Interface Software and Technology, Oct. 19, 2008, 10 pages.
Bjørneseth, et al., "Dynamic Positioning Systems—Usability and Interaction Styles," retrieved at <<http://www.ceng.metu.edu.tr/~tcan/se705_s0809/Schedule/assignment3.pdf>>, Proceedings of the 5th Nordic Conference on Human-Computer Interaction: Building Bridges, Oct. 2008, 10 pages.
Brandl, et al., "Occlusion-aware menu design for digital tabletops", Proc. of the 27th Int'l Conf. on Human Factors in Computing Systems, CHI 2009, Extended Abstracts, Apr. 4-9, 2009, pp. 3223-3228, Boston, MA, USA.
Buxton, William, "Chunking and Phrasing and the Design of Human-Computer Dialogues," retrieved at <<http://www.billbuxton.com/chunking.pdf>>, Proceedings of the IFIP World Computer Congress, Sep. 1986, 9 pages.
Buxton, William, "Integrating the Periphery and Context: A New Model of Telematics Proceedings of Graphics Interface", 1995, pp. 239-246.
Buxton, William, "Lexical and Pragmatic Considerations of Input Structure," retrieved at <<http://acm.org>>, ACM SIGGRAPH Computer Graphics, vol. 17, Issue 1, Jan. 1983, pp. 31-37.
Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, Apr. 2008, pp. 1779-1788.
Cheng, et al., iGrasp: Grasp-Based Adaptive Keyboard for Mobile Devices, 2013 ACM SIGCHI Conf. on Human Factors in Computing Systems, CHI Extended Abstracts 2013, Apr. 27-May 2, 2013, pp. 2791-2792, Paris, France.
Cheng, et al., "iRotateGrasp: Automatic Screen Rotation Based on Grasp of Mobile Devices", 2013 ACM SIGCHI Conf. on Human Factors in Computing Systems, CHI Extended Abstracts 2013, Apr. 27-May 2, 2013, pp. 2789-2790, Paris, France.
Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mobile Devices and Services, Sep. 2007, pp. 190-197.
Li et al., "Virtual Shelves: Interactions with Orientation-Aware Devices," retrieved at <<http://acm.org>>, UIST'09, Oct. 2009, pp. 125-128.
Cohen, et al., "Synergistic Use of Direct Manipulation and Natural Language," retrieved at <<http://acm.org>>, CHI '89 Proceedings of the SIGCHI Conference on Human Factors in Computing Systems, Apr. 1989, pp. 227-233.
Dachselt, et al., "Throw and Tilt—Seamless Interaction Across Devices Using Mobile Phone Gestures", Proceedings of the 34th Graphics Interface Conference, May 2008, 7 pages.
Döring, et al., "Exploring Gesture-Based Interaction Techniques in Multi-Display Environments with Mobile Phones and a Multi-Touch Table", Proceedings of the Workshop on Coupled Display Visual Interfaces, May 25, 2010, pp. 47-54.
"DuoSense Pen, Touch & Multi-Touch Digitizer," retrieved at <<http://www.n-trig.com/Data/Uploads/Misc/DuoSense_Brochure_FINAL.pdf>>, May 2008, N-trig Ltd., Kfar Saba, Israel, 4 pages.
Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.
Eslambolchilar, et al., "Tilt-Based Automatic Zooming and Scaling in Mobile Devices—a state-space implementation." retrieved at <<http://www.dcs.gla.ac.uk/~rod/publications/EslMur04-SDAZ.pdf>>, Proceedings of Mobile HCI2004: 6th International Conference on Human Computer Interaction with Mobile Devices, Springer, Sep. 2004, 12 pages.
Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.
Fiftythree Inc., "A Closer Look at Zoom", May 21, 2013, pp. 1-10.
Fiftythree Inc., "Pencil", Nov. 19, 2013, pp. 1-12.
Frisch, et al., "Investigating Multi-Touch and Pen Gestures for Diagram Editing on Interactive Surfaces", In ACM International Conference on Interactive Tabletops and Surfaces, Nov. 23, 2009, 8 pages.
Goel, et al., "GripSense: Using Built-In Sensors to Detect Hand Posture and Pressure on Commodity Mobile Phones", In Proceedings of the 25th Annual ACM Symposium on User interface Software and Technology, Oct. 7, 2012, 10 pages.
Guiard, et al., "Writing Postures in Left-Handers: Inverters are Hand-Crossers", Neuropsychologia, Mar. 1984, pp. 535-538, vol. 22, No. 4.
Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, Oct. 2008, pp. 205-208.
Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.
Harrison, et al., "Squeeze Me, Hold Me, Tilt Me! An Exploration of Manipulative User Interfaces", In Proceedings of the SIGCHI Conference on Human Factors in Computing Systems, Apr. 18, 1998, 8 pages.

(56) References Cited

OTHER PUBLICATIONS

Hasan, et al., "A-Coord Input: Coordinating Auxiliary Input Streams for Augmenting Contextual Pen-Based Interactions", In Proceedings of the SIGCHI Conference on Human Factors in Computing Systems, May 5, 2012, 10 pages.
Hassan, et al., "Chucking: A One-Handed Document Sharing Technique," T. Gross et al. (Eds.): Interact 2009, Part II, LNCS 5727, Aug. 2009, pp. 264-278.
Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), Aug. 1978, pp. 210-216.
Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.
Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, Apr. 2005, pp. 451-460.
Hinckley, et al., "Direct Display Interaction via Simultaneous Pen + Multi-touch Input", In Society for Information Display (SID) Symposium Digest of Technical Papers, May, 2010, 4 pages.
Hinckley, et al., "Foreground and Background Interaction with Sensor-Enhanced Mobile Devices," retrieved at <<http://research.microsoft.com/en-us/um/people/kenh/papers/tochisensing.pdf>>, ACM Transactions on Computer-Human Interaction, vol. 12, No. 1, Mar. 2005, 22 pages.
Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, Apr. 2010, pp. 2793-2802.
Hinckley, Paper: Motion and Context Sensing Techniques for Pen Computing, http://kenhinckley.wordpress.com/, Jul. 31, 2013, pp. 1-3.
Hinckley, et al., "Pen + Touch=New Tools", In Proceedings of the 23nd Annual ACM Symposium on User Interface Software and Technology, Oct. 3, 2010, 10 pages.
Hinckley, et al., "Sensing Techniques for Mobile Interaction", In Proceedings of the 13th Annual ACM Symposium on User Interface Software and Technology, Nov. 5, 2000, 10 pages.
Hinckley, et al., "Sensor Synaesthesia: Touch in Motion, and Motion in Touch", In Proceedings of the SIGCHI Conference on Human Factors in Computing Systems, May 7, 2011, 10 pages.
Hinckley, Ken, "Synchronous Gestures for Multiple Persons and Computers", In Proceedings of the 16th Annual ACM Symposium on User Interface Software and Technology, Nov. 2, 2003, 10 pages.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.
Hudson, et al., "Whack Gestures: Inexact and Inattentive Interaction with Mobile Devices", In Proceedings of the Fourth International Conference on Tangible, Embedded, and Embodied Interaction, Jan. 25, 2010, 4 pages.
Ion, F., Getting started with Andriod's use profiles, Mar. 18, 2014, IDG Consumer, pp. 1-7.
Iwasaki, et al., "Expressive Typing: A New Way to Sense Typing Pressure and Its Applications," retrieved at <<http://acm.org>>, CHI '09 Proceedings of the 27th International Conference Extended Abstracts on Human Factors in Computing Systems, Apr. 2009, pp. 4369-4374.
Izadi, et al., "C-Slate: A Multi-Touch and Object Recognition System for Remote Collaboration using Horizonta Surfaces", Second Annual IEEE International Workshop on Horizontal Interactive Human-Computer System, Oct. 2007, pp. 3-10.
"International Preliminary Report on Patentability Issued in PCT Application No. PCT/US2015/034612", dated Aug. 29, 2016, 8 pages.
"Supplemental Notice of Allowance Issued in U.S. Appl. No. 14/303,203", dated Jun. 12, 2017, 2 pages.
"International Search Report & Written Opinion Issued in PCT Application No. PCT/US2015/034612", dated Sep. 4, 2015, 12 pages.

Core Pen Grips and Poses 100

Ready to Act 108　　Half Supination 110　　Full Supination 112

Writing Grips 102

Tuck Grips 104

Palm Grips 106

SENSOR CORRELATION FOR PEN AND TOUCH-SENSITIVE COMPUTING DEVICE INTERACTION

CROSS-REFERENCE TO RELATED APPLICATIONS

This application is a Continuation application of U.S. patent application Ser. No. 14/303,203, filed on Jun. 12, 2014 by Hinckley, et al., and entitled "SENSOR CORRELATION FOR PEN AND TOUCH-SENSITIVE COMPUTING DEVICE INTERACTION," and claims priority to U.S. patent application Ser. No. 14/303,203.

BACKGROUND

Many mobile computing devices (e.g., tablets, phones, etc.), as well as other devices such as desktop digitizers, drafting boards, tabletops, e-readers, electronic whiteboards and other large displays, use a pen, pointer, or pen type input device in combination with a digitizer component of the computing device for input purposes. Many of these computing devices have touch-sensitive screens and interact with pen and with bare-handed touch or with the two in combination.

SUMMARY

This Summary is provided to introduce a selection of concepts in a simplified form that are further described below in the Detailed Description. This Summary is not intended to identify key features or essential features of the claimed subject matter, nor is it intended to be used as an aid, in determining the scope of the claimed subject matter.

In general, embodiments of a pen and computing device sensor correlation technique as described herein correlate sensor signals received from various grips on a touch-sensitive pen (e.g., also called a pen, sensor pen or touch-sensitive stylus herein) and touches to, or grips on, a touch-sensitive computing device (for example, a touch-sensitive tablet computing device) in order to determine the context of such grips and touches and to issue context-appropriate commands to the touch-sensitive pen and/or the touch-sensitive computing device.

In various embodiments of the pen and computing device sensor correlation technique a combination of concurrent sensor inputs received from both a touch-sensitive pen and a touch-sensitive computing device are correlated. How the touch-sensitive pen is gripped and the how the touch-sensitive computing device is touched or gripped are used to determine the context of their use and the user's intent. A user interface action based on these grip and touch inputs can then be initiated.

In some embodiments of the pen and computing device sensor correlation technique, pen and computing device motions can also be correlated with the concurrent touch and grip sensor inputs to determine whether either device is held in the user's preferred hand or the user's non-preferred hand, to determine the context inferred, and to initiate context-appropriate commands and capabilities. For example, the determined context can be used to initiate commands to suppress accidental content rotation on a display, to pan or zoom content displayed on a display, to display a menu of pen specific tools, to display a menu of canvas tools or drafting tools, or to display a magnifier/loupe tool that magnifies content on the display of the computing device, among others.

Furthermore, some embodiments of the pen and computing device sensor correlation technique can be used to find meta information to semantically label the context of the sensed grips or touches. For example, some pen and computing device sensor correlation technique embodiments correlate the received signals of the contacts by a user on two or more touch-sensitive devices and determine the context of the contacts based on the correlation of the signals. The determined context of the contacts is labeled as metadata for use in an application. For example, this context can be which hand the user is holding a device in, how the user is holding the device, how many users are sharing a device, and so forth. The derived metadata can be used to label any type of input and can be used for other purposes. The context metadata also can be used to initiate a context-appropriate user interface action.

Many, many other capabilities that exploit the natural ways a user or users hold and touch a touch-sensitive pen and/or a touch-sensitive computing device in order to provide the user with context-specific tools are possible.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
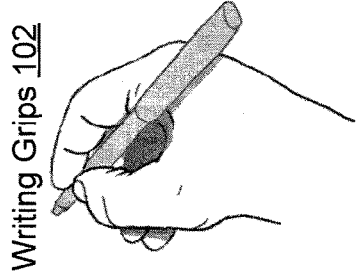
FIG. 1 depicts exemplary naturally-occurring core pen grips and poses.
Figure 1:
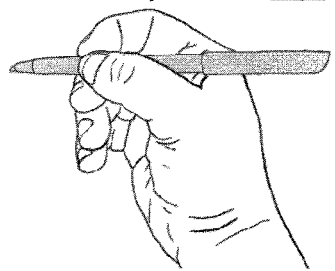
Figure 1:
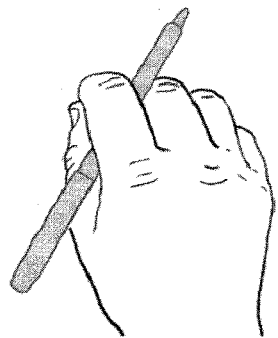
Figure 1:
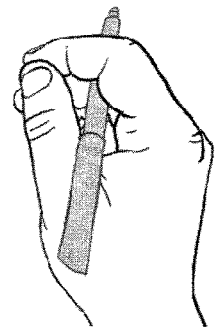
Figure 1:
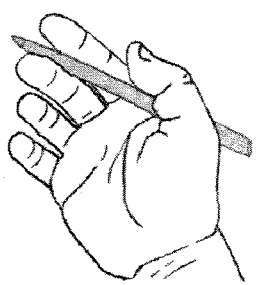
Figure 1:
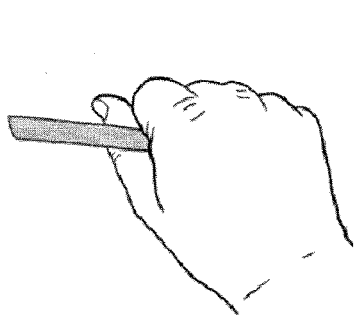
Figure 1:
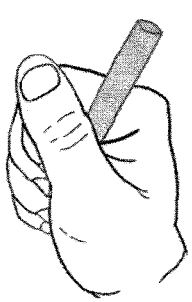
Figure 1:
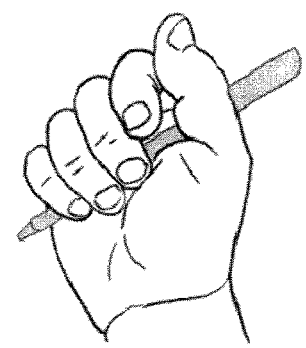

In the following description of the implementations of the claimed subject matter, reference is made to the accompanying drawings, which form a part hereof, and in which is shown by way of illustration specific implementations in which the claimed subject matter may be practiced. It should be understood that other implementations may be utilized and structural changes may be made without departing from the scope of the presently claimed subject matter.

1.0 Introduction

The following paragraphs provide an introduction to mobile sensing, sensor-augmented pens, grip sensing, and pen+touch input on touch-sensitive computing devices.

1.1 Mobile Sensing on Handheld Computing Devices

Tilt, pressure, and proximity sensing on mobile devices enables contextual adaptations such as detecting handedness, portrait/landscape detection, or walking versus stationary usage. Grip sensing allows a mobile device to detect how the user holds it, or to use grasp to automatically engage functions such as placing a call, taking a picture, or watching a video. Implementations of the pen and computing device sensor correlation technique described herein adopt the perspective of sensing natural user behavior, and applying it to single or multiple touch-sensitive pen and touch-sensitive computing device (e.g., tablet) interactions.

Multi-touch input and inertial sensors (Inertial Measurement Units (IMU's) with 3-axis gyroscopes, accelerometers, and magnetometers) afford new possibilities for mobile devices to discern user intent based on grasp and motion dynamics. Furthermore, other sensors may track the position of these mobile devices. Implementations of the pen and computing device sensor correlation technique illustrate new techniques that leverage these types of motion sensing, grip sensing, and multi-touch inputs when they are distributed across separate pen and touch-sensitive computing (e.g., tablet) devices.

1.2 Grips and Sensing for Tablets

Lightweight computing devices such as tablets afford many new grips, movements, and sensing techniques. Implementations of the pen and computing device sensor correlation technique described herein are the first to implement full grip sensing and motion sensing—on both tablet and pen at the same time—for sensing pen+touch interactions. Note that "grip" may be recognized by the system as a holistic combination of a particular hand-contact pattern that takes into account the 3D orientation or movement of the implement or device as well; that is, no clear line can be drawn between touch-sensitive grip-sensing and inertial motion-sensing, per se, since all these degrees of freedom may be employed by a recognition procedure to classify the currently observed "grip" as accurately as possible. Thus, whenever the term "grip" is used the possible combination of touch with motion or orientation degrees-of-freedom is implied.

1.3 Palm Detection and Unintentional Touch Handling

Palm contact can cause significant false-activation problems during pen+touch interaction. For example, some note-taking applications include palm-blocking but appear to rely on application-specific assumptions about how and where the user will write. Some palm-rejection techniques require the user to bring the pen tip on or near the screen before setting the palm down, which requires users to modify their natural movements. Implementations of the pen and computing device sensor correlation technique use sensors to detect when a touch screen contact is associated with the hand holding the pen.

1.4 Sensor-Augmented and Multi-DOF Pen Input

Auxiliary tilt, roll, and other pen degrees-of-freedom can be combined to call up menus or trigger mode switches without necessarily disrupting natural use. Implementations of the pen and computing device sensor correlation technique implement capabilities where the user can extend one or more fingers while tucking the pen. The pen and computing device sensor correlation technique implementations can sense these contacts as distinct contexts with separate functions, even if the user holds the pen well away from the screen.

Pens can be augmented with motion, grip, and near-surface range sensing. One type of pen uses grip sensing to detect a tripod writing grip, or to invoke different types of brushes. Other systems use an integrated IMU on the pen as a feature to assist grip recognition and sense the orientation of associated computing device/tablet (e.g. for horizontal vs. drafting table use) to help provide appropriate sketching aids. The pen and computing device sensor correlation technique implementations described herein go beyond these efforts by exploring sensed pen grips and motion in combination with pen+touch gestures, and also by extending grip sensing to the tablet itself.

2.0 Natural Pen and Tablet User Behaviors

Implementations of the pen and computing device sensor correlation technique described herein use natural pen and touch-sensitive computing device (e.g., tablet) user behaviors to determine the context associated with these behaviors in order to provide users with context-appropriate tools. As such, some common grips that arise during digital pen-and-tablet tasks, and particularly touch screen interactions articulated while the pen is in hand are useful to review and are enumerated below and shown in FIGS. 1, 2, 3 and 4. A wide variety of behaviors (listed as B1-B11 below) have been observed and were used in designing various implementations of the pen and computing device sensor correlation technique. The following paragraphs focus on behaviors of right-handers; left-handers are known to exhibit a variety of additional grips and accommodations. It should be noted that the behaviors discussed below and shown in FIGS. 1, 2, 3 and 4 are only exemplary in nature and other behaviors are entirely possible.

2.1 Behavior B1. Stowing the Pen while Using Touch.

The tendency of users to stow the pen when performing touch gestures on a touch screen of a touch-sensitive computing device such as the tablet is obvious. Users typically only put the pen down when they anticipate they will not need it again for a prolonged time, or if they encounter a task that they feel is too difficult or awkward to perform with pen-in-hand, such as typing a lot of text using the on-screen keyboard.

2.2 Behavior B2. Tuck Vs. Palm for Stowing the Pen.

There are two distinct grips that users employ to stow the pen. These are a Tuck grip (pen laced between fingers) shown in FIG. 1 104 and a Palm grip (with fingers wrapped lightly around the pen barrel) shown in FIG. 1 106. Users stow the pen during pauses or to afford touch interactions.

2.3 Behavior B3. Preferred Pen Stowing Grip Depends on Task Context.

For users that employ both Tuck grips 104 and Palm grips 106, a Tuck grip affords quick, transient touch interactions, while a Palm grip is primarily used if the user anticipates a longer sequence of touch interactions. Other users only use Tuck grips 104 to stow the pen.

2.4 Behavior B4 Grip Vs. Pose.

For each grip—that is, each way of holding the pen—a range of poses where the pen orientation is changed occur, often by wrist supination (i.e. turning the palm upward). Human grasping motions with a pen therefore encompass the pattern of hand contact on the barrel, as well as the 3D orientation of the pen. As shown in FIG. 1, full palmar supination 112 is observed for the Tuck grip 104 and Palm grip 106, but only half-supination 110 for the Writing grip.

2.5 Behavior B5. Extension Grips for Touch.

Figure 2:
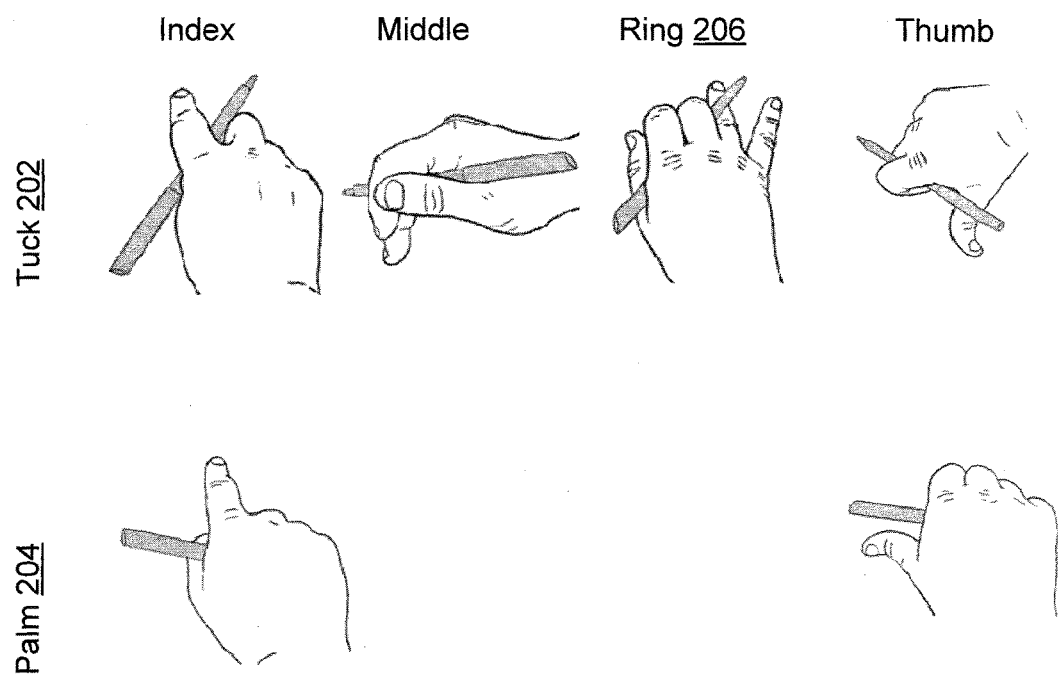
FIG. 2 depicts exemplary naturally-occurring single finger extension grips for touch screen manipulation.
Figure 3:
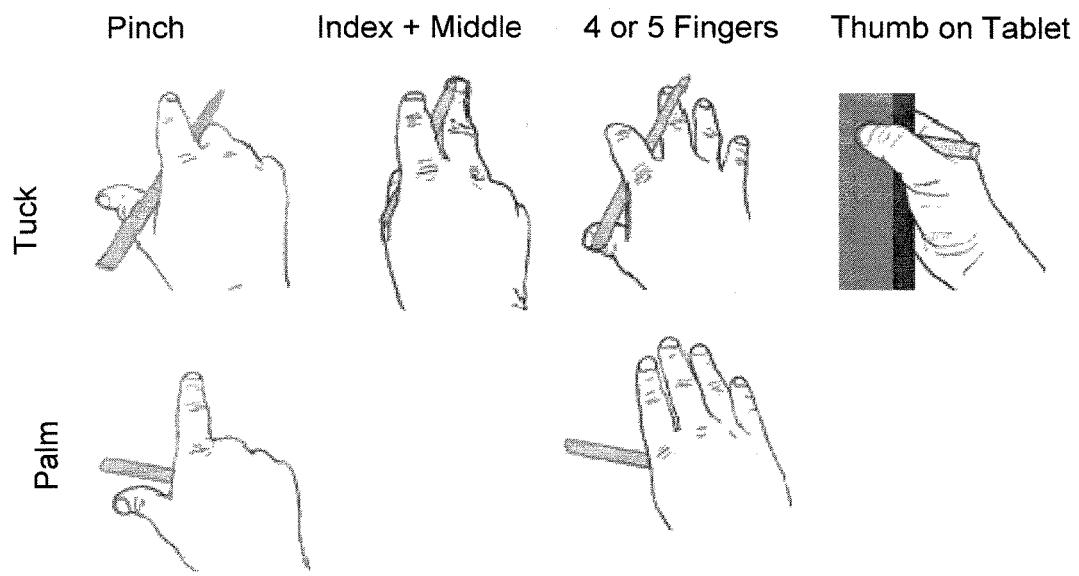
FIG. 3 depicts exemplary naturally-occurring multiple finger extension grips for touch screen manipulation.

As shown in FIGS. 2 and 3, many Extension Grips exist where users extend one or more fingers while holding the pen to make contact with a touch screen. These were classified broadly as single-finger extension grips (FIG. 2, 200) vs. multiple-finger extension grips (FIG. 3, 300), which users can articulate from either the Tuck or the Palm grip. (Note that, while not illustrated, three-finger extension grips are also possible from some grips).

2.6 Behavior B6. Variation in Pen Grips.

Users exhibit many variations in a tripod grip for writing which leads to variations in users' resulting Tuck, Palm, and Extension grips. For example, one user's style of tucking led her to favor her ring finger for single-touch gestures (see Tuck-Ring Finger Extension Grip (FIG. 2, 206)).

2.7 Behavior B7. Consistency in Grips.

Each user tends to consistently apply the same pen grips in the same situations. Users also tend to maintain whatever grip requires the least effort, until a perceived barrier in the interaction (such as fatigue or inefficiency) gives them an incentive to shift grips. Users switch grips on a mobile computing device (e.g., tablet) more often when sitting than standing, perhaps because there are few effective ways to hold or re-grip such a device while standing.

2.8 Behavior B8. Touch Screen Avoidance Behaviors.

Users often adopt pen grips and hand postures, such as floating the palm above a touch screen while writing, or splaying out their fingers in a crab-like posture, to avoid incidental contact with the screen. Another form of touch screen avoidance is perching the thumb along the outside rim of touch-sensitive computing device (e.g., the tablet bezel), rather than letting it stray too close to the touch screen when picking up the touch-sensitive computing device. These unnatural and potentially fatiguing accommodations reflect a system's inability to distinguish the context of intentional versus unintentional touch.

2.9 Behavior B9. Finger Lift for Activating Pen Controls.

Figure 4:
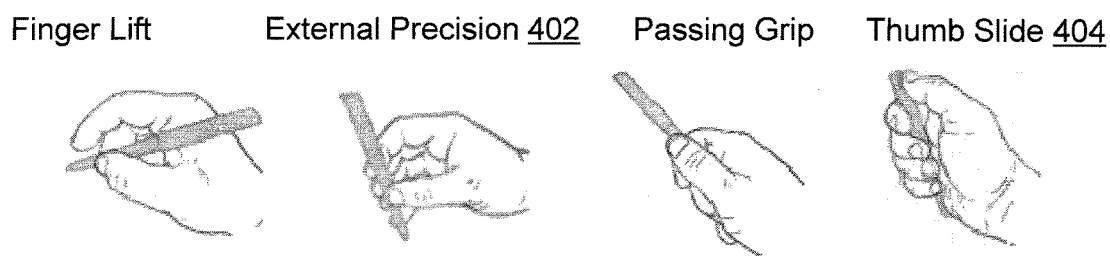
FIG. 4 depicts other types of naturally-occurring pen grips.

It was observed that users only activate a pen barrel button from the Writing grip (FIG. 1, 102, 108, 110), and then only with the index finger. Users hold the pen still when tapping the button. The thumb is also potentially available for controls from the Palm-like Thumb Slide grip (FIG. 4, 404).

2.10 Behavior B10. External Precision Grip.

Users employ an External Precision grip (FIG. 4, 402), with the pen held toward the fingertips and perpendicular to the writing surface, for precise pointing at a small target. This provides the possibility to provide contextual enhancements, such as automatically zooming the region of the tablet screen under the pen tip, when this grip is detected.

2.11 Behavior B11. Passing Grip.

Passing prehension is observed when participants pass the pen and touch-sensitive computing device (e.g., tablet) to another person. Users tend to hold the device securely, in more of a power grip, and extend it from their body while keeping it level, so that their intent is clear and so that the other person can grab it from the far side.

Having described these natural behaviors, the following sections describe how the recognition of all of these grips, touches and motions are used to leverage these behaviors in order to provide context-appropriate tools for carrying out a user's intended actions.

3.0 Introduction to the Pen and Computing Device Sensor Correlation Technique:

The pen and computing device sensor correlation technique implementations described herein contribute cross-device synchronous gestures and cross-channel inputs for a touch-sensitive computing device/pen (e.g., tablet-stylus) distributed sensing system to sense the naturally occurring user behaviors and unique contexts that arise for pen+touch interaction. Note, however, that while much of the discussion here focuses on pen/tablet interactions, other pen-like mechanical intermediaries or small wearable devices can enable context-sensing while interacting with tablets using variations of the pen and computing device sensor correlation technique. A small motion-sensing ring worn on the index finger, for example, could sense when the user taps the screen with that finger versus, another digit. Watches, sensors worn on the fingertip or fingernail, bracelets, armbands, bandages or wraps, elbow pads, braces, wrist-bands, gloves augmented with sensors, subcutaneous implants, or even e-textile shirt sleeves with embedded sensors, represent other similar examples that would enable and suggest related techniques to individuals skilled in the art. Likewise, other manual tools such as a ruler, compass, scalpel, tweezer, stamp, magnifying glass, lens, keypad, calculator, french curve, shape template, paint-brush, or airbrush could serve as pen-like implements, whether held in the preferred or non-preferred hand, that also enable related techniques.

Implementations of the pen and computing device sensor correlation technique described herein employ grip and touch sensing to afford new techniques that leverage how users naturally manipulate these devices. Implementations of the pen and computing device sensor correlation technique can detect whether the user holds the pen in a writing grip or palmed and/or tucked between his fingers in a stowed mode. Furthermore, pen and computing device sensor correlation technique implementations can distinguish barehanded inputs, such as drag and pinch gestures produced by a user's non-preferred hand, from touch gestures produced by the hand holding the touch-sensitive pen which necessarily imparts a detectable motion signal to the pen. Implementations of the pen and computing device sensor correlation technique can sense which hand grips the touch-sensitive computing device (e.g., tablet), and determine the screen's relative orientation to the pen and use the screen's orientation and touch patterns to prevent accidental screen content rotation. By selectively combining sensor signals from the touch-sensitive pen and the touch-sensitive computing device and using them to complement one another, implementations of the pen and computing device sensor correlation technique can tailor user interaction with them to the context of use, such as, for example, by ignoring unintentional touch inputs while writing, or supporting contextually-appropriate tools such as a magnifier for detailed stroke work that appears when the user pinches with the touch-sensitive pen tucked between his fingers.

Implementations of the pen and computing device sensor correlation technique, as described herein, use a touch-sensitive pen enhanced with a power supply (e.g., battery) and multiple sensors (e.g., a sensor pen) to enable a variety of input techniques and commands based on the correlated grip patterns of a user holding the touch-sensitive pen and touch contacts and grips on the touch-sensitive computing device (e.g., a touch-sensitive tablet computer) and associated motions and orientations of these devices. For example, pressure sensors can be used to detect the user's grip patterns on the sensor pen and touch and grip patterns on the touch-sensitive computing device. Implementations of the pen and computing device sensor correlation technique correlate sensor pen grips and touch-sensitive computing device touches and grips to determine the intentions of the user and the context in which the user wishes to use the touch-sensitive pen or the touch-sensitive computing device. This is based on naturally occurring user behaviors such as, for example, whether a user is gripping either device with their preferred hand or their non-preferred hand. The determined user intentions and context of use are then used to generate context-appropriate commands and capabilities for the touch-sensitive computing device and/or the touch-sensitive pen.

The term pressure as described herein, as relating to pressure sensors and the like, may refer to various sensor types and configurations. For example, in various cases and implementations, pressure may refer to pen tip pressure exerted on a display. In general, pen tip pressure is typically sensed by some type of pressure transducer inside the pen, but it is also possible to have the pen tip pressure sensing done by the display/digitizer itself in some devices. In addition, the term pressure or pressure sensing or the like may also refer to a separate channel of sensing the grip pressure of the hand (or fingers) contacting an exterior casing or surface of the touch-sensitive pen or touch-sensitive computing device. Various sensing modalities employed by the pen and computing device sensor correlation technique may employ both types of pressure sensing (i.e., pen tip pressure and grip pressure) for initiating various capabilities and commands.

Various devices used to enable some of the many implementations of the pen and computing device sensor correlation technique described herein include pens, pointers, pen type input devices, etc., that are often referred to herein as a sensor pen or touch-sensitive pen for purposes of discussion. Further, the sensor pens or touch-sensitive pens described herein can be adapted to incorporate a power supply and various combinations of sensors. For example, there are various possibilities of incorporating power into the pen, such as by inductive coupling, a super capacitor incorporated into the pen that recharges quickly when the pen comes in range or is docked to or placed on/near a computing device, a battery incorporated in the pen, obtaining power via pen tether, or acquiring parasitic power via motions of the pen. The power supply may feature automatic low-power modes when the pen is not moving or not being held. The sensors may inform this decision as well. Various combinations of sensors can include, but are not limited to, inertial sensors, accelerometers, pressure sensors, grip sensors, near-field communication sensors, RFID tags and/or sensors, temperature sensors, microphones, magnetometers, capacitive sensors, gyroscopes, sensors that can track the position of a device, finger print sensors, galvanic skin response sensors, etc., in combination with various wireless communications capabilities for interfacing with various computing devices. Note that any or all of these sensors may be multi-axis or multi-position sensors (e.g., 3-axis accelerometers, gyroscopes, and magnetometers). In addition, in various implementations, the touch-sensitive pens described herein have been further adapted to incorporate memory and/or computing capabilities that allow them to act in combination or cooperation with other computing devices, other touch-sensitive pens, or even as a standalone computing device.

Implementations of the pen and computing device sensor correlation technique are adaptable for use with any touch-sensitive computing device having one or more touch-sensitive surfaces or regions (e.g., touch screen, touch sensitive bezel or case, sensors for detection of hover-type inputs, optical touch sensors, etc.). Note that touch-sensitive computing devices include both single- and multi-touch devices. Examples of touch-sensitive computing devices can include, but are not limited to, touch-sensitive display devices connected to a computing device, touch-sensitive phone devices, touch-sensitive media players, touch-sensitive e-readers, notebooks, netbooks, booklets (dual-screen), tablet type computers, or any other device having one or more touch-sensitive surfaces or input modalities. The touch-sensitive region of such computing devices need not be associated with a display, and the location or type of contact-sensitive region (e.g. front of a device on the display, versus back of device without any associated display) may be considered as an input parameter for initiating one or more motion gestures (i.e., user interface actions corresponding to the motion gesture).

The term "touch" as used throughout this document will generally refer to physical user contact (e.g., finger, palm, hand, etc.) on touch sensitive displays or other touch sensitive surfaces of a computing device using capacitive sensors or the like. However, some touch technologies incorporate some degree of non-contact sensing, such as the use of highly sensitive self-capacitance detectors to detect the geometry of the fingers, pen, and hand near the display—as well as the pen-tip hover sensing. Arrays of IR sensor-emitter pairs or sensor-in-pixel display elements can also be deployed on pens, tablets, and keyboards for this purpose. Hence touch and grip may incorporate such non-contact signals for a holistic or unified notion of "grip" detection as well.

In addition, pen and computing device sensor correlation technique implementations can use a variety of techniques for differentiating between valid and invalid touches received by one or more touch-sensitive surfaces of the touch-sensitive computing device. Examples of valid touches and contacts include user finger touches (including gesture type touches), pen or pen touches or inputs, hover-type inputs, or any combination thereof. With respect to invalid or unintended touches, pen and computing device sensor correlation technique implementations disable or ignore one or more regions or sub-regions of touch-sensitive input surfaces that are expected to receive unintentional contacts, or intentional contacts not intended as inputs, for device or application control purposes. Examples of contacts that may not be intended as inputs include, but are not limited to, a user's palm resting on a touch screen while the user writes on that screen with a pen or holding the computing device by gripping a touch sensitive bezel, etc.

The pen and computing device sensor correlation technique implementations provide a number of advantages relating to pen-based user interaction with a touch-sensitive pen and touch-sensitive computing devices, including, but not limited to:

- Novel solutions that sense grip and motion to capture the full context of pen and touch-sensitive computing device (e.g. tablet) use.
- Using sensors to mitigate unintentional touch (from the palm, or from the thumb when picking up the device), but also to promote intentional touch by a non-preferred hand, or via extension grips to interleave pen and touch inputs.
- Novel contextually-appropriate tools that combine grip, motion, and touch screen contact, including, for example, distinct tools for bare-handed input, pinch input while tucking the pen, and drafting tools that the user can summon with the non-preferred hand when the pen is poised for writing.

3.0 Exemplary System:

The pen and computing device sensor correlation technique implementations operate, in part, by correlating sensor inputs from a touch-sensitive pen and a touch-sensitive computing device to trigger various actions and capabilities with respect to either the touch-sensitive pen or the touch-sensitive computing device or both.

Figure 5:
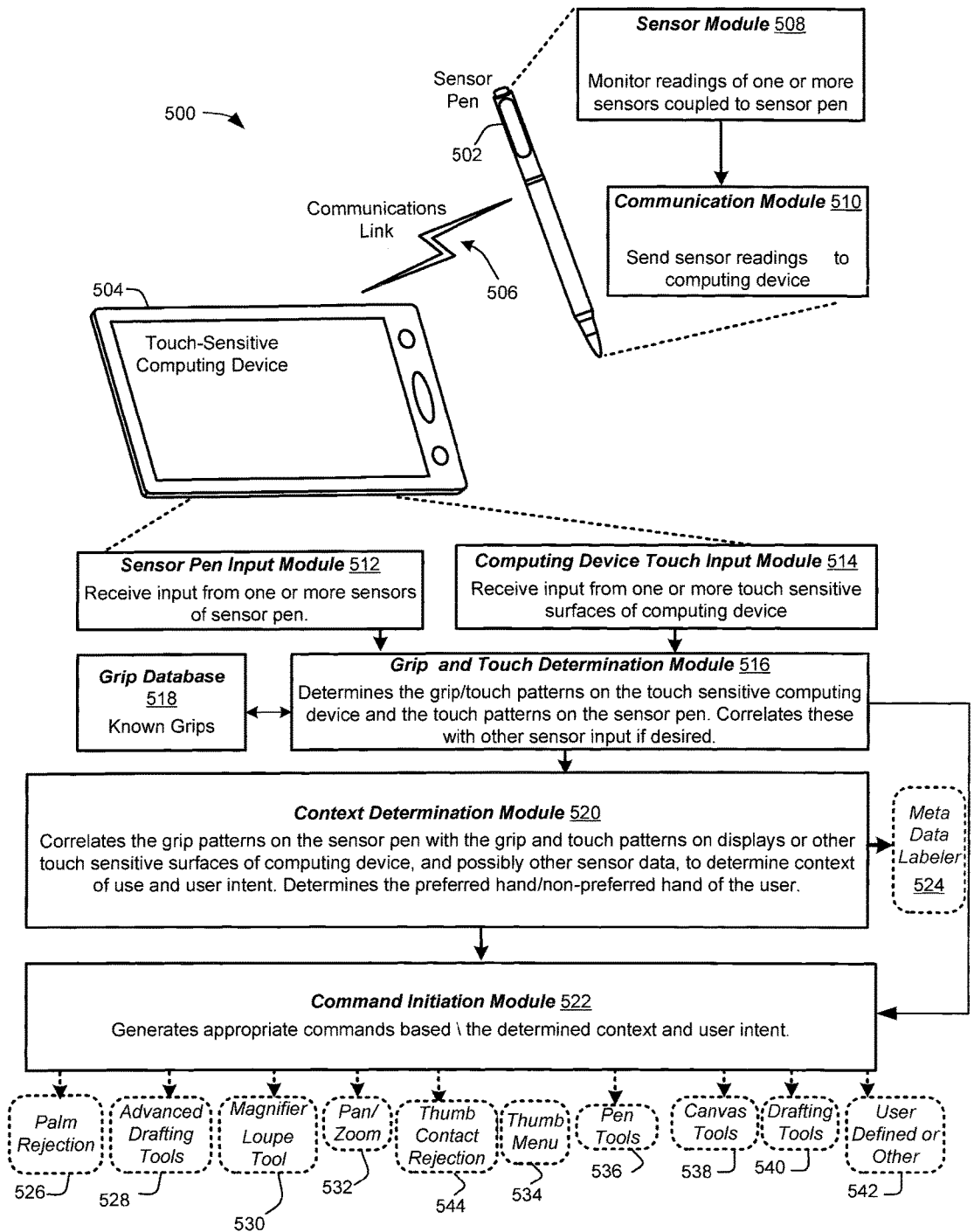
FIG. 5 provides an exemplary system that illustrates program modules for implementing various implementations of the pen and computing device sensor correlation technique, as described herein.

FIG. 5 provides a diagram of an exemplary system 500 that illustrates program modules for implementing various implementations of the pen and computing device sensor correlation technique. More specifically, FIG. 5 shows a touch-sensitive pen or sensor pen 502 in communication with touch-sensitive computing device 504 via communications link 506. As discussed in further detail herein, the sensor pen 502 can include a variety of sensors. A sensor module 508 in the sensor pen 502 monitors readings of one or more of those sensors, and provides them to a communications module 510 to be sent to the touch-sensitive computing device 504 (or possibly another computing device (not shown) that performs computations and provides inputs to the touch-sensitive computing device 504). It should be noted that in another implementation some (or all) computation may be done directly on the pen before sending (i.e., grip recognition with machine learning), and some data might not always be sent to the touch-sensitive computing device (i.e., if the outcome is used local to the pen). In some instances, the touch-sensitive computing device may send information to the pen instead of, or on top of, the pen sending data to the touch-sensitive computing device.

A sensor pen input module 512 receives input from one or more sensors of sensor pen 502 (e.g., inertial, accelerometers, pressure, touch, grip, near-field communication, RFID, temperature, microphones, magnetometers, capacitive sensors, gyroscopes, IR or capacitive proximity sensors, finger print sensors galvanic skin response sensors, etc.) and provides that sensor input to a grip and touch determination module 516. Similarly a computing device touch input module 514 receives input from one or more sensors of the touch-sensitive computing device 504 (e.g., inertial, accelerometers, pressure, touch, grip, near-field communication, RFID, temperature, microphones, magnetometers, capacitive sensors, gyroscopes, IR or capacitive proximity sensors, finger print sensors, galvanic skin response sensors, etc.) and provides that sensor input to a grip and touch determination module 516.

The grip and touch determination module 516 determines the grip of a user on the sensor pen 502 based on the contact of a user's hand on touch-sensitive surfaces of the sensor pen (and/or the orientation of the pen—yaw, pitch roll or some subset of that—and/or other information from the sensors). For example, the sensor signals from the user's grip on the pen can be compared to a database 518 of grip patterns in order to determine the grip pattern or patterns of a user gripping the pen. In one implementation a trained classifier is used to classify the sensor signals into grip patterns on the sensor pen 502 based on grip training data. Note that this grip training data may be (1) for a large sample of many users; (2) adapted or trained based only on inputs from the specific user; and (3) some weighted combination of the two. Also, separate databases based on salient dimensions of the input (e.g. left-handed vs. right-handed user, size or type of the device being used, current usage posture of the device, whether on a desk, held-in-hand, resting on the lap, and so forth) may trigger the use of separate databases optimized in whole or in part to each use-case. Similarly, the grip and touch determination module 516 determines the touch of the user on a display of the touch-sensitive computing device 504 based on the signals of contact of the user's fingers or hand on a display of the touch-sensitive computing device (and/or the orientation of the device and/or other information from the sensors). Additionally, the grip and touch determination module 516 can determine if the user is gripping touch-sensitive surfaces of the case of the touch-sensitive computing device. For example, the sensor signals from the user's grip on the case of the touch-sensitive computing device can be compared to a database 518 of grip patterns in order to determine the grip pattern or patterns of the user gripping the device. In one implementation, one or more touch-sensitive sensors report an image of what parts of the case are being touched. Various image processing techniques can be used to interpret the image and deduce the grip. In one implementation, a (multi-touch, capacitive) grip pattern is sensed on the case of the device (e.g., the case incorporates a matrix of capacitive sensors) and motion signals and orientation of the touch-sensitive computing device (and/or pen) are also fed into this determination. In some implementations, if the touch screen has non-contact proximity sensing capability, then sensing proximity at the screen edges of the device can serve as a good proxy for grip sensing on the case. In one implementation a trained classifier is used to classify the sensor signals into grip patterns on the case of the touch-sensitive computing device based on grip training data.

The grip and touch determination module 516 correlates the sensor inputs from the sensors of the sensor pen 502 and the touch-sensitive computing device 504 to associate how the user is gripping the pen with how the user is interacting with the screen or the case of the touch-sensitive computing device. This correlated data can be used to determine the user's preferred hand/non-preferred hand of a user touching the sensor pen and/or the touch sensitive computing device. In one implementation, the preferred hand is distinguished from the non-preferred hand due to the pen motion. A bump in the pen motion is measured when a part of the preferred hand comes in contact with the touch screen of the computing device. After the contact, it can also be continuously confirmed that the pen motion correlates to the touch screen motion in order to confirm that the hand holding the pen is being held in the user's preferred hand. In some implementations it is not necessary for the pen to register a bump when it touches the screen (e.g., if the touch to the screen is very subtle or soft) in order to determine the user's preferred hand or non-preferred hand as long as correlating motions are observed.

The determined grip and touch patterns, as well as other correlated sensor inputs, can also be input into a context determination module 520. The context determination module 520 determines the user's intent and the context of the actions that the user is intending from the correlated grip patterns, touch patterns and other sensor data. Context examples include, but are not limited to, how many users are interacting with a pen or touch-sensitive computing device, how many devices are being interacted with, whether a user is holding the sensor pen or the computing device in the user's preferred vs. non-preferred hand, individual or relative motions of the pen or the computing device, how the touch-sensitive pen or the touch-sensitive computing device is being gripped or touched, application status, pen orientation, touch-sensitive computing device orientation, relative orientation of the sensor pen to the computing device, trajectories and/or accelerations of the touch-sensitive pen and the touch-sensitive computing device, identity of the user, and so forth. This context data can be sent to a metadata labeling module 524 which can be used to semantically label this data.

The touch/grip patterns and other associated sensor readings and any associated context data are input into the command initiation module 522. The command initiation module 522 evaluates the available inputs to trigger one or more commands or capabilities on the touch-sensitive computing device and/or the sensor pen in order to assist in carrying out the user's intent in a more efficient and user friendly manner by triggering or activating one or more commands or motion gestures on the touch-sensitive pen 502 and/or the touch sensitive computing device 504. Examples of various motion gestures triggered or commands (526, 528, 530, 532, 534, 536, 538, and 540) which will be discussed in detail below are activated by the command initiation module 522. Implementations of the pen and computing device sensor correlation technique allow user-defined motion gestures 542 to be defined via a user interface that allows the user to define one or more capabilities or motion gestures using sensor pen grips in combination with touch inputs and/or grips on the touch-sensitive computing device 504. Many of the motion gestures or capabilities 526 through 540 are described in further detail later in this document, with examples of many of these motion gestures and capabilities being illustrated in FIG. 11 through FIG. 17.

With respect to hover range, in various implementations, the pen and computing device sensor correlation technique considers distance of the sensor pen 502 above the digitizer of the touch-sensitive computing device 504. While a variety of ranges can be considered, in various tested implementations, three range categories were considered, including: physical contact, within hover range of the digitizer, or beyond range of the digitizer. The activation mechanism for any particular motion gestures may consider these different ranges of the sensor pen, in combination with any other correlated inputs, touches, and/or motions of the computing device.

In some implementations the raw sensor readings can be reported or transmitted from the sensor pen 502 to the computing device 504 for evaluation and characterization by the computing device. For example, raw sensor data from inertial sensors within the sensor pen 502 can be reported by the sensor pen to the touch-sensitive computing device 504, with the computing device then determining pen orientation as a function of the data from the inertial sensors. Alternately, in various implementations, the sensor pen 502 uses onboard computational capability to evaluate the input from various sensors. For example, sensor data derived from inertial sensors within the sensor pen 502 can be processed by a computational component of the sensor pen to determine pen orientation, with the orientation of tilt then being reported by the sensor pen to the computing device 504.

Any desired combination of reporting of raw sensor data and reporting of processed sensor data to the computing device by the sensor pen 502 can be performed depending upon the computational capabilities of the sensor pen. However, for purposes of explanation, the discussion herein generally refers to reporting of sensor data to the touch-sensitive computing device 504 by the sensor pen 502 for further processing by the computing device to determine various commands, motion gestures or other input scenarios. In some implementations the user's touch on the touch-sensitive screen of the computing device is correlated to a bump to the gyro or accelerometer in the pen in order to determine what the user is doing. In fact, many implementations of the technique use correlations between touch, bump onto a pen and pen grip to determine what the user's intentions are. A few examples of various motion gestures and capabilities enabled by the pen and computing device sensor correlation technique are briefly introduced below.

For example, one such input technique, referred to as a "Magnifier" or "Loupe tool" (FIG. 5, 530), uses a sensor input from the user's grip on the touch-sensitive pen 502 to discern that the pen is held in a tucked position in the user's hand. Concurrently, the user's touch on the touch-sensitive screen of the computing device is registered to that of the user making a two-finger touch gesture such as a pinching motion relative to the screen. These two sensed inputs are correlated so that the pinching motion with the hand holding the pen brings up the Magnifier/Loupe tool 530. The rationale is that since the user demonstrates the intent to use the pen again soon by the fact the pen is stowed only temporarily and still at the ready, touch interactions with the pen-holding-hand should emphasize capabilities in support of the pen. The Magnifier/Loupe tool 530 is advantageous in that it supports and emphasizes a quick zooming that affects a local area of the content displayed on the screen only, which is especially well suited to detail work with the pen. In some implementations the user's touch on the touch-sensitive screen of the computing device is correlated to a bump to the gyro or accelerometer in the pen in order to determine the user's intent.

A related gesture referred to as a "full-canvas pan/zoom" gesture (FIG. 5, 532), in one implementation uses a sensed user's two-finger touch gesture such as a pinching motion on the display of the touch-sensitive computing device 504 (e.g., tablet) with the user's non-preferred hand to trigger a standard full canvas zoom of content displayed on the display of the computing device. This functionality is provided when the sensor pen 502 is not at the ready (e.g., when the sensor pen is held in a Tucked grip or a Palmed grip in the user's preferred hand, or the user is not holding the sensor pen at all). The non-preferred hand gesture, then, can be recognized as such due to the lack of corresponding motion in the pen.

Another gesture, referred to herein as a "pen tools" gesture (FIG. 5, 536), uses sensors of the sensor pen 502 and the touch-sensitive computing device 504 to detect that the user is holding the sensor pen in a tucked position (e.g., Tucked grip) in the user's preferred hand and to detect a concurrent contact such as a tap from a finger of the user's preferred hand on the touch-sensitive display of the computing device 504. The correlation of these two actions brings up a menu of pen-specific tools. In some implementations a different palette of pen tool options can be displayed when the pen is held in a fully palmed position in the user's preferred hand.

A similar gesture, referred to herein as a "canvas tools" gesture (FIG. 5, 538) uses sensors of the pen and on the touch-sensitive computing device to detect when a user is holding the touch-sensitive pen 502 in a non-writing position in the user's preferred hand and to detect a contact such as a finger tap with the user's non-preferred hand on the touch screen of the computing device 504. These correlated concurrent actions cause a menu of canvas tools to be displayed on the display of the computing device. For example, this menu of tools could include undo/redo, cut-copy-paste, new page, search and similar commands.

Another gesture, referred to herein as a "drafting tools" gesture (FIG. 5, 540) uses sensors of the pen 502 and on the touch-sensitive computing device 504 to detect that the touch-sensitive pen is held in a writing grip in the user's preferred hand and to detect a contact such as a one finger touch to the touch-sensitive display of the computing device 504 with the user's non-preferred hand. The one finger tap with the user's non-preferred bare hand brings up a set of drafting tools when the pen is ready to write. These special tools support the use of the pen. Such tools might be, for example, a compass to draw arcs or an airbrush to color content on the screen.

Additionally, an "advanced drafting tools" gesture (FIG. 5, 528) uses sensors on the pen 502 and sensors on the touch-sensitive computing device 504 to detect that the sensor pen is held in a writing grip in the user's preferred hand and to detect a two-finger touch gesture such as a pinching motion at the touch-sensitive display of the computing device with the user's non-preferred hand. The pinching motion with the user's non-preferred hand brings up a set of advanced drafting tools when the pen is ready to write. These special tools further support use of the pen that benefits from a second touch. For example, these advanced drafting tools can include a ruler or alignment edge, a French curve or a function to pull a new sheet of paper (with two-finger position, rotation, and/or scaling possibly, depending on the particular advanced drafting tool employed).

Other examples of correlated sensor pen motions relative to the computing device include using pen sensors (e.g., accelerometers, pressure sensors, inertial sensors, grip sensors, etc.) to determine when the sensor pen is picked up or put down by the user. By considering the current sensor grip pattern (i.e., tucked in the user's preferred hand, ready to write in the user's preferred hand, put down) correlated with the grip patterns of the user on the computing device (e.g., not held by the user, touching the display with the user's non-preferred hand or non-preferred hand, etc.), appropriate commands can be initiated.

Some implementations of the pen and computing device sensor correlation technique use capacitive grip sensing on the back and sides of the case of the touch-sensitive computing device 504 to detect a number of additional contacts.

Some implementations of the pen and computing device sensor correlation technique can be used in a multiple user/multiple device mode. For example, in some implementations a grip of a primary user on a touch-sensitive computing device 504 and a grip of a secondary user on the touch-sensitive computing device are sensed and correlated. The grips can be sensed, for example, by touch-sensitive surfaces on the touch-sensitive computing device or the grips can be sensed by determining each user's galvanic skin response and the differences in the galvanic skin response can be used to tell one user from the other. Other sensor data can also be used, such as, for example, accelerometer data, position data, trajectory data and so forth. The grips of the primary and secondary users are evaluated to initiate a command in an application executing on the touch-sensitive computing device 504. The correlated grips and the orientation of the touch-sensitive computing device 504 can be evaluated to determine that the grip of the secondary user represents a handoff of the computing device to the secondary user from the primary user. In this case one or more capabilities of the touch-sensitive computing device may be restricted following the handoff. Alternately, the grip of the secondary user can be determined to be concurrent with the grip of the primary user. In this case, a sharing mode can be entered on the computing device. For example, the secondary user may only be allowed to view and markup only content that is currently displayed on a display of the computing device. There are many instances where the user picks up and holds a pen with both hands, making the pen unavailable.

Implementations of the pen and computing device sensor correlation technique use grip to sense with which hand the user is holding the touch-sensitive computing device 504. Implementations of the pen and computing device sensor correlation technique then use this to summon a "Thumb Menu" (FIG. 5, 534) at the appropriate side of the touch-sensitive computing device 504, which advantageously allows the user to activate various buttons and menus directly with the thumb. If the user grasps the touch-sensitive computing device with a second hand, implementations of the pen and computing device sensor correlation technique leave the Thumb Menu visible at the side where it first appeared.

Similar to the touch-sensitive computing device, in some implementations of the pen and computing device sensor correlation technique a grip of a primary user and the grip of a secondary user on a touch-sensitive pen 502 can be sensed. As discussed previously, other data such as acceleration, position and trajectory data, for example, may also be considered. The grips of the primary and secondary users can then be correlated to initiate a command in an application executing on the touch-sensitive pen 502. For example, the grip of the secondary user can be determined to represent a handoff of the pen 502 to the secondary user from the primary user. In this case data can be transferred from the primary user to the secondary user via the handoff of the pen 502. The secondary user can then download the transferred data to a computing device—for example a different computing device that the stylus was originally used with. Alternately, one or more capabilities of the touch-sensitive pen 502 can be restricted following the handoff.

Besides grip patterns on the sensor pen 502 and on the computing device 504, some implementations consider motion of the computing device and the sensor pen. For example, implementations use the motions of the sensor pen 502 and the computing device along with the grip patterns to determine if the pen is held in the user's preferred hand (or non-preferred hand). The user's preferred hand and non-preferred hand can be determined from the correlated grip patterns and associated information. For example, when a motion signal representing a pen bump occurs at the same time as a new contact on the touch-sensitive computing device the grips/touches on both the sensor pen 502 and the touch-sensitive computing device 504 are correlated and specific motion gestures or commands are initiated based on these recognized grip patterns.

Further, in various implementations, the pen and computing device sensor correlation technique also advantageously rejects or ignores unwanted or unintended touches by a user. A palm rejection module (FIG. 5, 526) can be used for this purpose. In particular, the palm rejection module 526 evaluates any touch to determine whether that touch was intended or it was made by a palm inadvertently resting on the touch-sensitive computing device, and then either accepts that touch as input for further processing, or rejects that touch. In addition, in various implementations, the palm rejection module disables or ignores (i.e., "rejects") user palm touches on or near particular regions of any touch-sensitive surfaces, depending upon the context of that touch. Note that "rejected" touches may still be handled by the pen and computing device sensor correlation technique as an input to know where the palm is planted, but flagged such that unintentional button presses or gestures will not be triggered in the operating system or applications by accident. In some implementations the pen and computing device sensor correlation technique is able to track the palm (for example using an assigned contact identifier) when the contact is moving (as long as the contact is touching.) Furthermore, in some implementations if new contacts are detected within a given radius of the palm contact, they will also be labeled as palm contacts (e.g., knuckles) and ignored. Similar to the palm rejection module 526, a thumb contact rejection module 544 can also be enabled.

4.0 Exemplary Processes

An exemplary system for practicing implementations of the pen and computing device sensor correlation technique having been described, the following section discusses exemplary processes for practicing various implementations of the pen and computing device sensor correlation technique.

Figure 6:
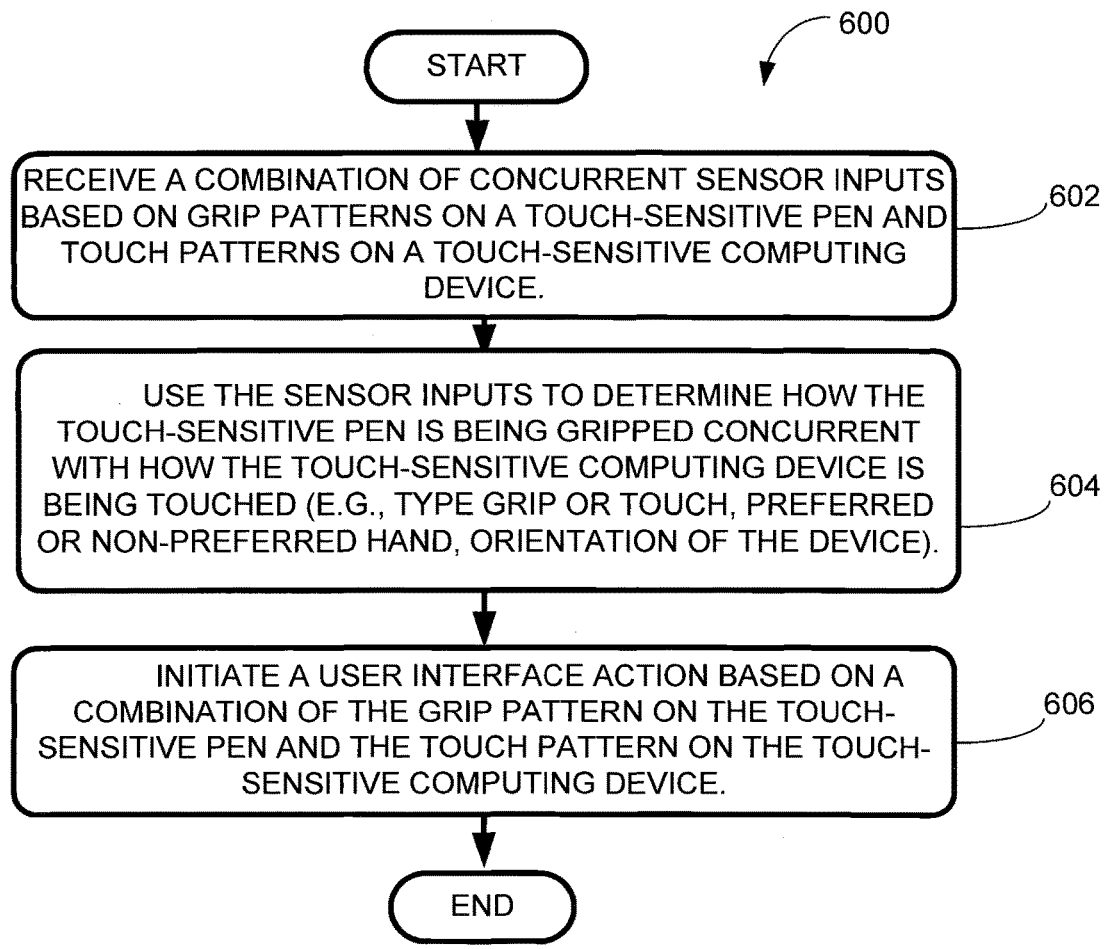
FIG. 6 provides an exemplary flow diagram of using the pen and computing device sensor correlation technique to provide a correlated touch and sensor pen input mechanism, as described herein.

FIG. 6 depicts an exemplary process 600 for practicing the one implementation of the technique. As shown in block 602, a combination of concurrent sensor inputs from a touch-sensitive pen device and a touch-sensitive computing device are received. These concurrent sensor inputs include one or more sensor inputs based on grip patterns on the touch-sensitive pen and one or more sensor inputs based on touch patterns on the touch-sensitive computing device. In some cases there may be no touch pattern on the pen or the touch-sensitive computing device if the user is not touching or gripping one of these two items. The sensor inputs are used to determine how the touch-sensitive pen is being gripped concurrent with how the touch-sensitive computing device is being touched, as shown in block 604. For example, the grip patterns and touch patterns are evaluated to determine if the user is using the user's preferred hand or the user's non-preferred hand (i.e., in some implementations the dominant/preferred hand is detected based on correlation of the touchdown of the hand on the touch-sensitive computing device with a bump in the accelerometer or the gyro of the touch-sensitive pen, and it is assumed that the pen is held in the preferred hand). A context-appropriate user interface action is initiated based on a combination of the grip pattern on the touch-sensitive pen and the touch pattern on the touch-sensitive computing device, as shown in block 606. For example, the determination of how the pen device is being touched by the user's preferred hand or non-preferred hand can be used to infer the context of use and/or user intent in order to initiate a context-appropriate command or capability such as those described with respect to FIG. 5.

Figure 7:
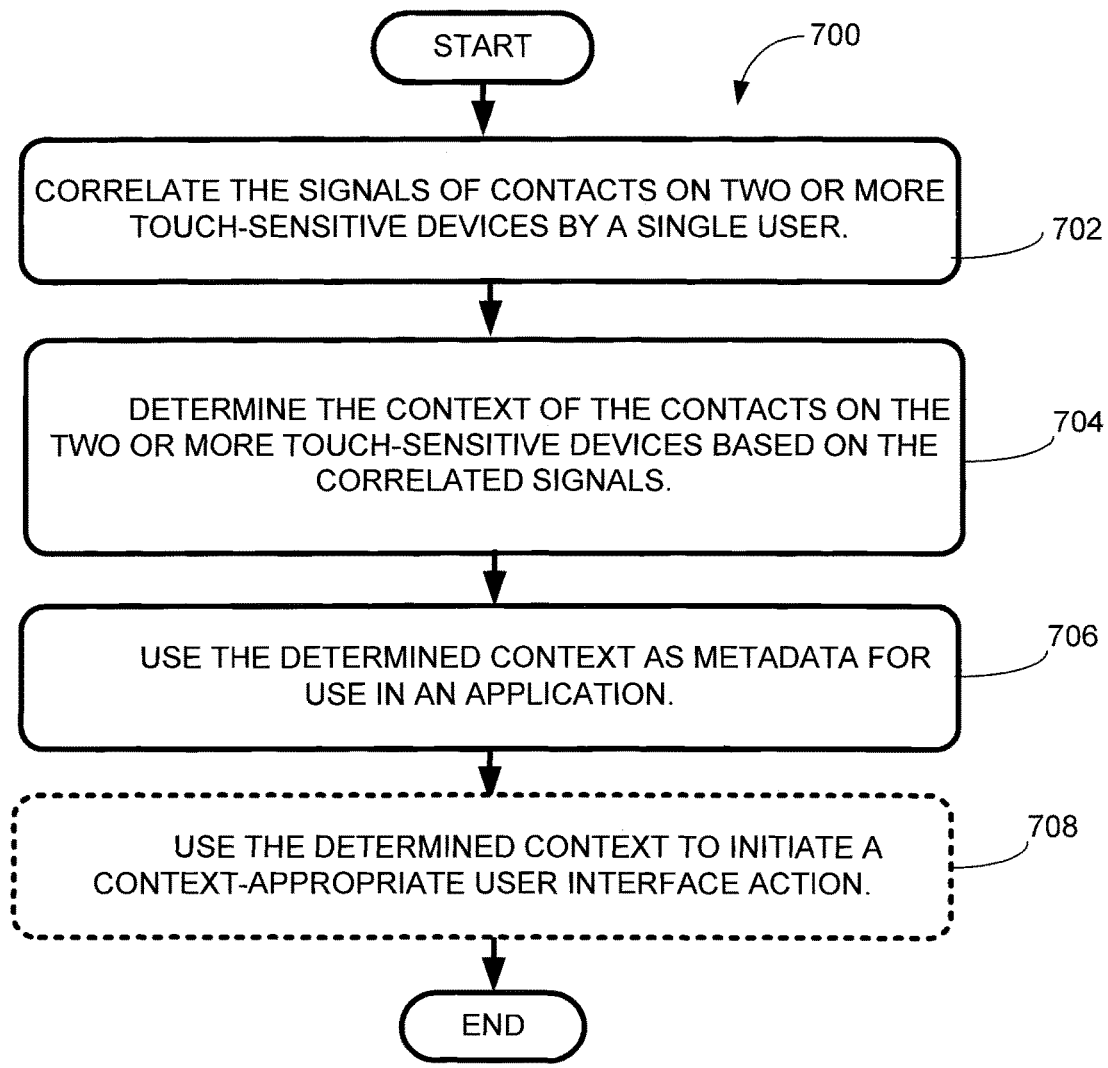
FIG. 7 provides an exemplary flow diagram of using the pen and computing device sensor correlation technique to provide metadata based on correlated signals received due to contacts on two or more touch-sensitive devices.

FIG. 7 depicts another exemplary implementation 700 for practicing the pen and computing device sensor correlation technique in order to find meta information. As shown in block 702, the signals of contacts on two or more touch-sensitive devices by a single user are correlated. For example, one of the two or more touch-sensitive computing devices can be a sensor pen and one could be a tablet computing device. The context of the contacts on the two or more touch-sensitive devices is determined based on the correlation of the signals, as shown in block 704. The determined context of the contact is labeled as metadata for use in an application, as shown in block 706. For example the context meta data could include, but is not limited to, how many users are interacting with a pen or touch-sensitive computing device, how many devices are being interacted with, whether a user is holding the sensor pen or the computing device in the user's preferred hand, individual or relative motions of the pen or the computing device, how the sensor pen or the touch-sensitive computing device is being gripped or touched, pen orientation, touch-sensitive computing device orientation, relative orientation of the sensor pen to the computing device, and so forth. If finger print sensors are available, fingerprints can be used to determine which user is holding a device, which finger(s) the user is touching the device with, if the user is holding the device with his preferred hand and in which grip, among other things. The finger print sensor could also be used to recognize the user by his or her finger print to establish a preferred mode for the user, for example. The metadata can be further used to initiate a context-appropriate user interface action, as shown in block 708, or it can be used for some other purpose. It should be noted that a similar process could be advantageously used to find and label metadata for more than one user.

Figure 8:
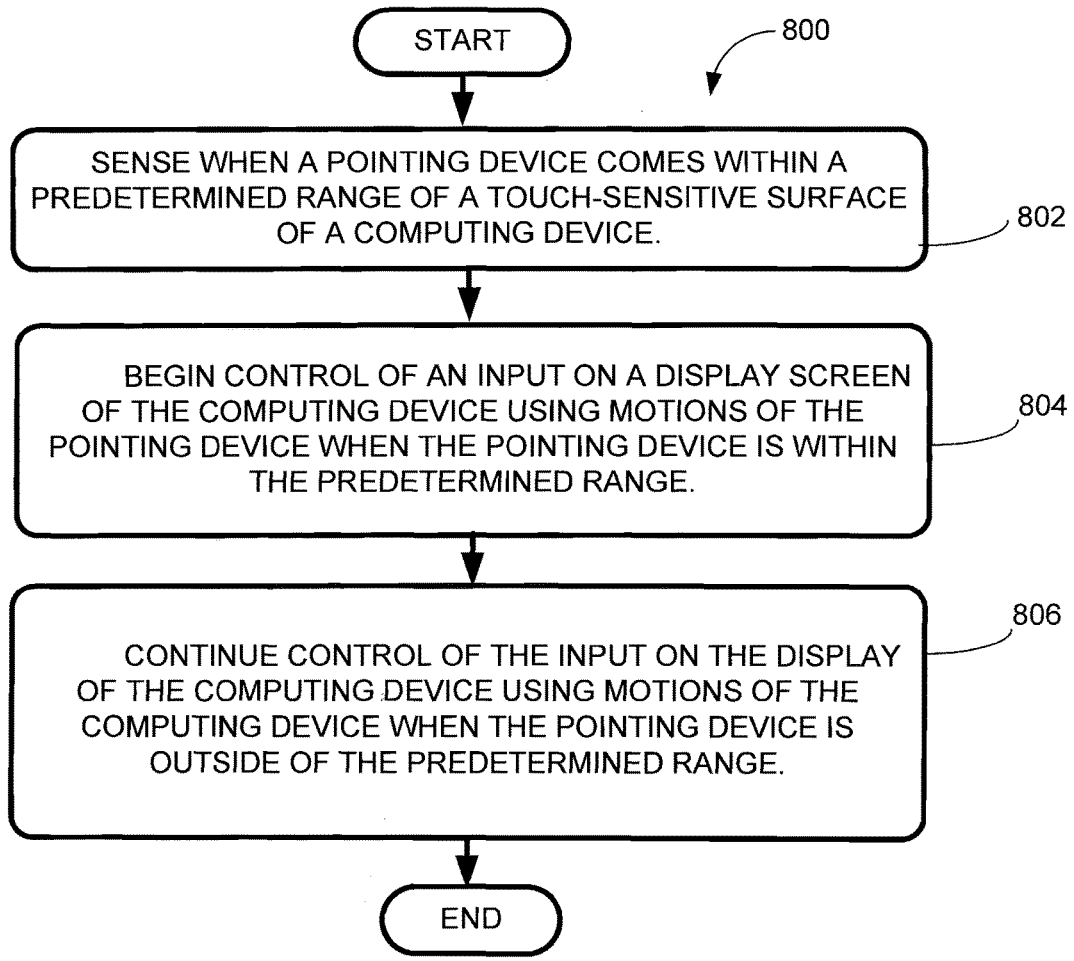
FIG. 8 provides an exemplary flow diagram of using a pointing device to continue control of an input on a display screen of a touch-sensitive computing device.

FIG. 8 depicts yet another exemplary implementation 800 for practicing the pen and computing device sensor correlation technique. As shown in block 802 when a pointing device comes within a predetermined range of a touch-sensitive surface of a computing device the presence of the computing device is sensed. For example, the pointing device could be a touch-sensitive pen. Control of an input on a display screen of the computing device is started using motions of the pointing device when the pointing device is within the predetermined range, as shown in block 804. Control of the input on the display screen is continued using motions of the pointing device when the pointing device is outside of the predetermined range, as shown in block 806. It should be noted that hover sensing is innate to electromagnetic digitizers, which sense the x,y location of the pointer tip (e.g., pen tip) when the pointer (e.g., pen) is close enough to the screen. The pointer (e.g., pen) will keep reporting its 3D orientation (and motion signals) via a radio link. This can also be used to infer some relative motion, or to continue cursor control. Some implementations of the pen and computing device sensor correlation technique can also use accelerometer or other sensor data to track the position of the computing device.

Figure 9:
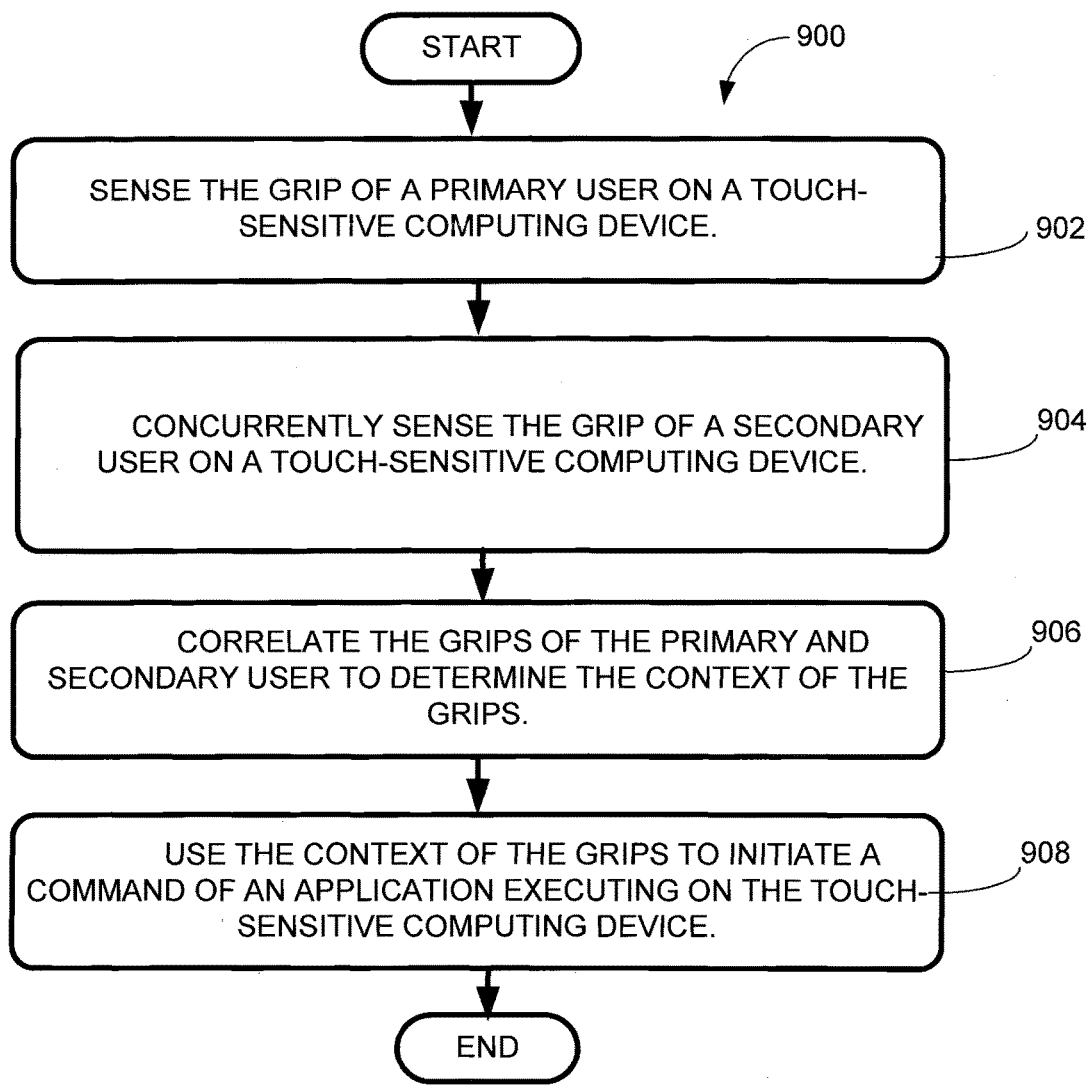
FIG. 9 provides an exemplary flow diagram of passing a touch-sensitive computing device from a primary user to a secondary user.

FIG. 9 depicts another exemplary process 900 for practicing the pen and computing device sensor correlation technique. A grip of a primary user on a touch-sensitive computing device is sensed using sensor data (for example, sensor data shows that the grip is with one hand, the device is flat and acceleration of the device is toward a secondary user who is most likely on the opposite side of the primary user), as shown in block 902. A grip of a secondary user on the touch-sensitive computing device is also sensed using sensor data (for example, sensor data shows a grip of the secondary user on the opposite side of the device as the primary user), as shown in block 904. The grips of the primary and secondary users are correlated to determine the context of the grips (for example whether they are sharing the device or they are passing it the other user) as shown in block 906, and to initiate a command in an application executing on the touch-sensitive computing device, as shown in block 908. As discussed previously the context of the grips could indicate that the touch-sensitive computing device is being passed from the primary user to the secondary user. Alternately, the context of the grips could indicate that the primary user is sharing the touch-sensitive computing device with the secondary user. Depending on the context different commands and capabilities will be enabled on the touch-sensitive computing device. For example, a user's intention to share their device could be confirmed, for example, by using a voice command.

Figure 10:
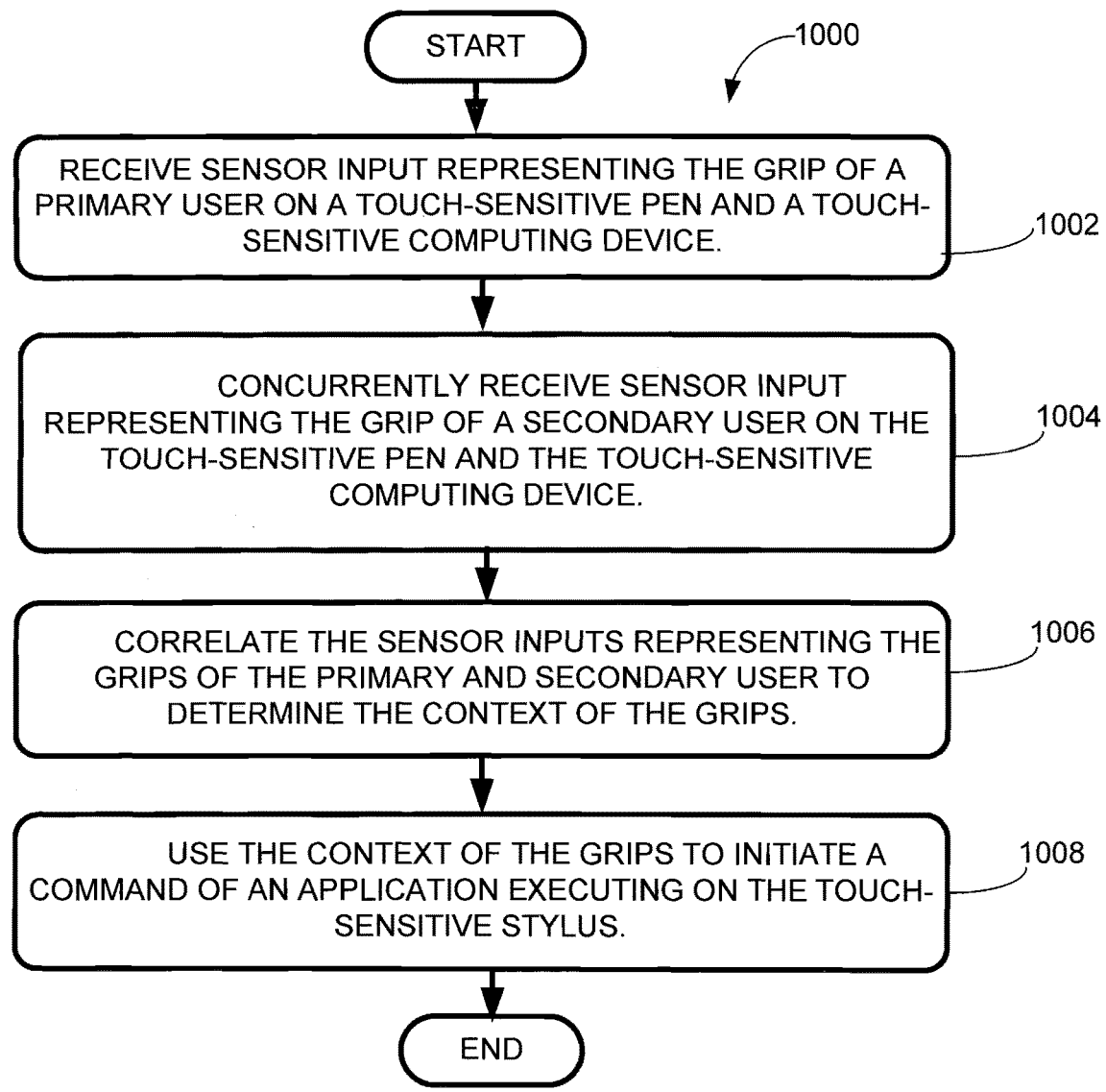
FIG. 10 provides an exemplary flow diagram of passing both a touch-sensitive computing device and a touch-sensitive pen from a primary user to a secondary user.

FIG. 10 depicts yet another exemplary process 1000 for practicing the pen and computing device sensor correlation technique. In this implementation both the touch-sensitive computing device and the touch-sensitive pen are passed from a primary user to a secondary user. As shown in block 1002, sensor inputs representing a grip of a primary user on the touch-sensitive computing device and the touch-sensitive pen are sensed. At about the same time, the sensor inputs representing a grip of the secondary user on the touch-sensitive computing device and the touch-sensitive pen are also sensed, as shown in block 1004. The grips of the primary and secondary users on the pen and the touch-sensitive computing device are correlated to determine the context of the grips (block 1006) and to initiate a command in an application executing on the touch-sensitive pen or on the touch-sensitive computing device, as shown in block 1008. For example, the grips can be determined to represent a handoff of the pen and the computing device to the secondary user from the primary user. In this case data can one or more capabilities of the touch-sensitive pen or the touch-sensitive computing device can be restricted following the handoff. Likewise, if the sensors and a digitizer on the touch-sensitive computing device indicate that the same user is employing the same pen on a different digitizer (e.g., on a different computing device), this can carry state information (such as the mode or color/thickness/nib style of the pen) or files and data (such as the current clipboard contents) across to another device. This can be determined by observing that a user is holding one tablet while writing or touching a finger to another, separate tablet, for example. In any of these implementations the determined context can be used to initiate a command in an application executing on the touch-sensitive computing device or on the touch-sensitive pen. Variations are also possible. For example, a single user may send commands or transfer data to many touch-sensitive computing devices using a single touch-sensitive pen. This is advantageous in that it allows a user to transfer data or objects from one device to one or many other devices.

5.0 Details and Exemplary Implementations:

An introduction to the pen and computing device sensor correlation technique implementations, as well as an exemplary system and exemplary processes for practicing the technique having been provided, the following paragraphs provide details of various exemplary implementations of the pen and computing device sensor correlation technique. Although many of the details below make reference to using a tablet computer in combination with a pen, it should be understood that this is just one exemplary device used to simplify the description. The exemplary implementations described below could be used with any touch-sensitive computing device (e.g., phone, desktop digitizer, phablet, e-reader, electronic whiteboard, vehicle touch-display and so forth).

By evaluating correspondences between touch-screen input (or touch inputs on other surfaces of the computing device) and touch-sensitive pen grips, the pen and computing device sensor correlation technique infers additional information about how the user is touching the screen or other touch-sensitive surface. By correlating signals from touch-sensitive pen grips with signals from bare-handed touch inputs on the computing device as well as motions and orientation of the pen and computing device and other sensor data, the pen and computing device sensor correlation technique enables a variety of context-appropriate tools and motion gestures to aid a user in completing intended tasks which can be inferred from the correlated sensor signals. Note that such correlations may look at correspondences (or non-correspondences, as the case may be) in motion or grip sensor data that occurs before, during, and after contact with the touch screen (for correlations involving the tablet digitizer). Information at or close to the time of contact may be used to determine a preliminary assessment of the type of contact, for example, with the possibility of a more definitive assessment at a later time as further sensor signals and device input events arrive in real-time. In this way, the system can provide immediate, or near-immediate, real-time response and feedback to the user's input events while taking maximum advantage of all the information to determine as correctly as possible the context of the user's actions.

For purposes of explanation, the following discussion will refer to a sketching or drawing type application in the context of a tablet-type computing device. However, it should be understood that both the sensor pen and the touch-sensitive computing device(s) are fully capable of interaction and interoperation with any desired application type or operating system type. In other application contexts, such as, for example, active reading or mathematical sketching, different gestures or mappings can be defined. In fact, as noted above, any desired user-definable gestures and concurrent pen-and-touch inputs can be configured for any desired action for any desired application, operating system, or computing device. Further, it should also be understood that voice or speech inputs, eye gaze inputs, and user proximity and body posture inputs (such as provided by a depth camera) can be combined with any of the various input techniques discussed herein above to enable a wide range of hybrid input techniques.

5.1 Grip+Motion Interaction Techniques

Exemplary implementations of the pen and computing device sensor correlation technique were employed in the context of a simple sketching application that supports annotation, panning and zooming, and some additional sketching tools. Some of the capabilities of these implementations are discussed in the paragraphs below. Many other implementations and combinations of these capabilities are possible.

5.1.1 Pen Orientation Sensed Relative to a Touch-Sensitive Computing Device In some implementations, inertial sensor fusion allows implementations of the pen and computing device sensor correlation technique to maintain a common reference frame relative to a touch-sensitive computing device such as, for example, a tablet. Some implementations of the technique employ a tablet-relative orientation at the grip-recognition phase, as well as in the interpretation of the pen motion (such as for the airbrush tool, described in more detail later). Some implementations of the technique only can sense the orientation of the pen relative to the touch-sensitive computing device (e.g., tablet). In some implementations, inertial sensing cannot reliably determine the (x,y) translation or z-altitude of the pen without resort to some other absolute external reference. In other implementations, where an external absolute reference is available, technique implementations may continue to track the absolute (x,y) and altitude (z) of the pen tip even when it is beyond the sensing range of the screen itself, by fusing the inertial sensing capability with the absolute reference. The absolute reference may be an extrinsic source (e.g. optical tracking of markings or IR sources on the pen) or intrinsic sources (e.g. radio signal strength triangulation to determine the approximate distance of the pen radio transceiver from other transceivers in the tablet or environment). In general, wireless and radio signal strengths can be used to approximate position which can be enough (when combined with fine-grained inertial sensing) to produce a good estimate of the x,y, z position of a device relative to another—this can be accomplished through the triangulation of multiple sources. Additionally, in some implementations a depth camera may be used to track the pen and/or the touch-sensitive computing device.

5.1.2 Detecting Unintentional Palm Contact

Sensing unintentional palm contact on a touch-sensitive surface or screen is a difficult problem because, at the onset of touch, there is often insufficient information to distinguish what type of touch is occurring. A palm can be recognized as a touch with a large contact area, but such contacts typically start small and may take a while to pass a certain size threshold. Also, some unintentional touches (such as contact produced by the knuckles) may never turn into a "large" contact. This strategy therefore necessitates delays (introduces lag) in processing touch events, and still may fail to detect many contacts.

To increase stability and avoid fatigue, users naturally rest their hand on the writing surface, but current tablet users are forced to adopt touch screen avoidance behaviors. Simply sensing that the user is holding the pen is not sufficient because people stow the pen while using touch and employ various extension grips to touch the screen. Pen orientation is also insufficient because each grip can be associated with a range of wrist supinations and because users hold the pen in a variety of ways.

However, since unintentional touch primarily occurs incident to writing, sensing the Writing grip itself is a powerful cue, particularly because the user typically adopts a writing grip prior to resting his hand on the display. Hence, a highly conservative palm-rejection procedure can simply reject any touch that occurs when the pen is held in the Writing grip. This, however, precludes intentional touches made by the non-preferred hand whenever the pen is held in the writing grip, which eliminates many desirable scenarios (e.g. panning and zooming with the nonpreferred hand), as well as simultaneous pen+touch gestures.

When a user plants his hand on the touch-sensitive screen of a computing device (e.g., tablet), it simultaneously induces a corresponding signal on the pen's motion sensors. (The device's motion sensors also pick up some of this motion, but it is damped somewhat by the greater mass of the device.) Nonetheless, motion signals from the pen and/or the touch-sensitive computing device (e.g., tablet) may be used in combination to help infer the type of contact that occurs, and may themselves be correlated with one another, such as to sense that the touch-sensitive computing device (e.g., tablet) is being moved while the pen is docked (attached) to it, or not.

When the hand holding the pen contacts the touch-sensitive computing device (e.g., tablet), the pen's motion exhibits a characteristic hard-contact profile similar to that seen with bump, whack, and thump gestures in other contexts. Implementations of the pen and computing device sensor correlation technique look for a peak in the signal corresponding to the pen's motion sensors (for example, by using the second order finite difference on the three combined axes of t an accelerometer or gyro) that exceeds a minimum threshold within a given window, for example a 10-sample window. It is known exactly when to look for this signal because a palm plant produces a bump in the pen's motion at the same time that the touch screen detects the new contact. Tested implementations of the pen and computing device sensor correlation technique can identify this peak within as little as 5 ms, or up to a maximum of 56 ms after the touch-down event in the worst case. Although in general the focus here is on palm contact on the screen portion of a device, note that this bump signal can be applied to both front and back-of-device hand contacts, i.e. touch signals produced by the touchscreen, by grip sensors on the casing of the tablet, or both. Hence back/side of device contacts can differentiate various types of hand and pen contact as well.

Thus implementations of the pen and computing device sensor correlation technique employ a fairly low threshold for the bump signal, allowing even rather subtle palm contact to be sensed, while also trivially rejecting other motion signals that do not occur coincident to a new touch screen contact. This detection scheme works well for most normal pen interactions during writing.

For as long as the detected palm contact persists, implementations of the pen and computing device sensor correlation technique can also flag any new touches as a "palm" if they land within a prescribed radius (for example, a 300 pixel radius) of the initial contact. In some implementations this may incorporate a model of expected hand contact regions, given the user's grip and angle of holding the pen, as well as the relative screen orientation, such as the hand occlusion models, among others. One implementation of the pen and computing device sensor correlation technique provides feedback of the initial palm detection by playing a brief animation of a "radar circle," centered on the palm-down location, that fades as it expands. This advantageously provides non-distracting feedback that confirms to the user that the palm contact was successfully detected. Without this feedback, the user may be left with a nagging uncertainty as to whether or not their palm has triggered an undesired action (such as calling up a menu, or leaving behind an ink trace) that is currently occluded by the hand. Such feedback is optional, however, and may be disabled by the user or by specific applications.

5.1.3 Permitting Intentional Touch

Implementations of the pen and computing device sensor correlation technique permit simultaneous intentional touches, even when the palm is resting on the screen. In general, in some implementations, any new touch that occurs away from the palm—which is outside of a predetermined radius of a previously detected palm contact and which is not accompanied by a bump on the pen)—represents a true intentional touch. Some implementations of the pen and computing device sensor correlation technique use the first two additional touches that are not flagged as a palm contact to support a pinch-to-zoom gesture. Palm contact is ignored and does not interfere with pan/zoom, even if the palm moves. Other single or multiple finger or whole hand gestures can also be supported.

However, because some implementations of the pen and computing device sensor correlation technique still track the palm—rather than outright 'rejecting' it per se—this approach also can support techniques that use the palm location as an input, such as to help to correctly orient menus or to anchor objects.

5.1.4 the Magnifier Tool Vs. Full Canvas Zoom

Figure 11:
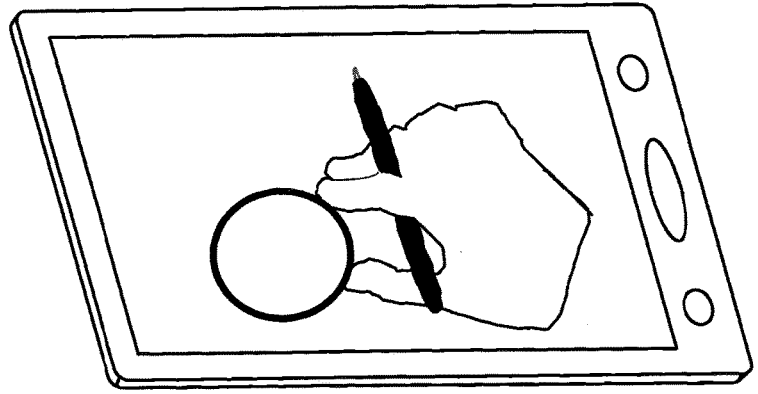
FIG. 11 provides an exemplary illustration of using the pen and computing device sensor correlation technique to provide a magnifier/loupe tool input mechanism based on the pen being held in a user's preferred hand in a tucked grip, as described herein.

The functionality of the Magnifier/Loupe Tool 1100 shown in FIG. 11 employs a focus-plus-context magnification technique (known as the "loupe") which is especially well suited to sketching tasks where the user wants to make a few detailed strokes without losing the overall context of the workspace. Implementations of the pen and computing device sensor correlation technique support both the Magnifier and Full-Canvas Zooming by sensing how the user is interacting with the pen and touch-sensitive computing device (e.g., tablet).

When the user stows the pen (in the Tuck or Palm grip), implementations of the pen and computing device sensor correlation technique recognize this grip. If the user then brings two fingers into contact with the display, implementations of the pen and computing device sensor correlation technique check the pen for a corresponding "bump" that occurs at approximately the same time as the touch signal. When implementations of the pen and computing device sensor correlation technique see this combined pen bump+two-finger touch signal, it brings up the Magnifier/Loupe Tool. Note that the two-finger touch signal does not require the fingers to touch at precisely the same time; a short grace period is allowed so that non-simultaneous touches can be correctly recognized as calling up the Loupe. In some implementations a response to a single finger touch is delayed slightly for a second finger touch to arrive. In other implementations a single finger action is started and then canceled (or undone) if a second finger is detected during an allotted time window. Spatial constraints on how close (or far) the two finger contacts must be can also be applied, if desired.

Figure 12:
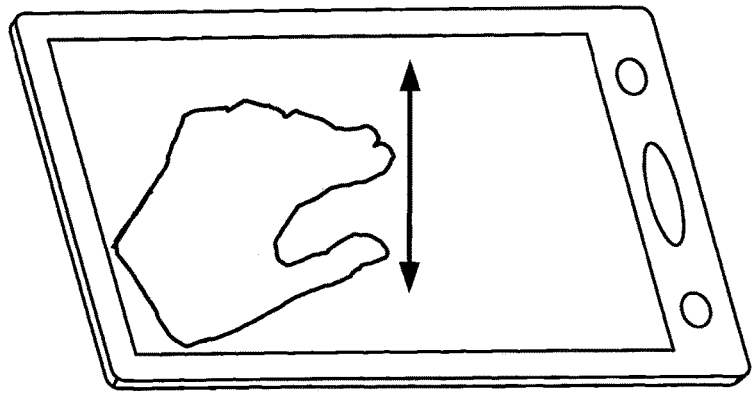
FIG. 12 provides an exemplary illustration of using the pen and computing device sensor correlation technique to provide a full-canvas pan/zoom input mechanism based on the actions of a user's non-preferred hand, as described herein.
Figure 13:
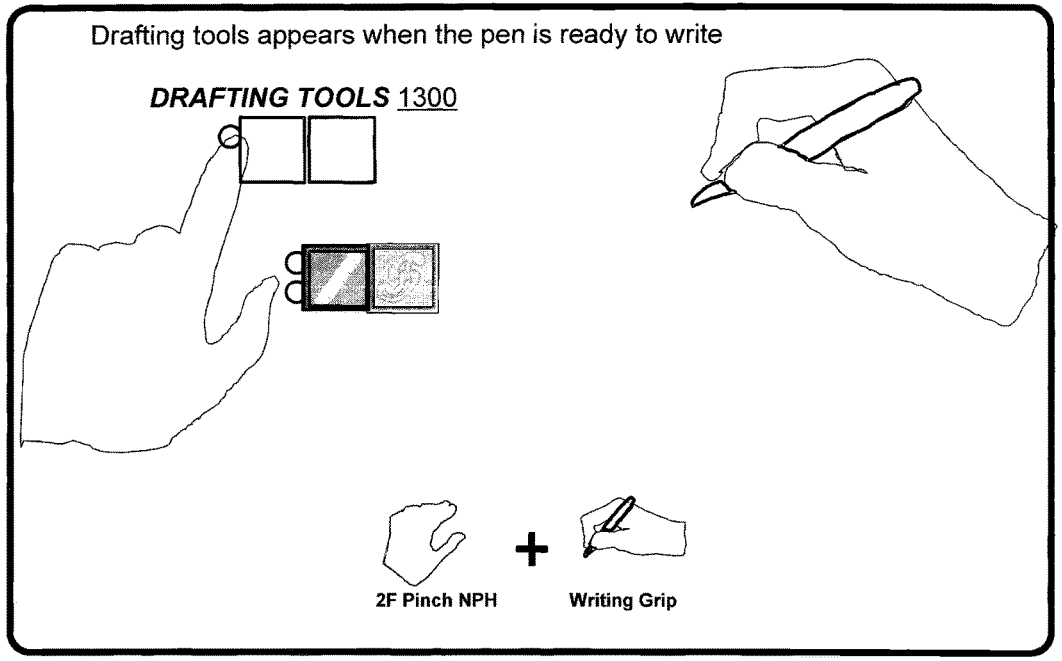
FIG. 13 provides an exemplary illustration of using the pen and computing device sensor correlation technique to provide a drafting tool input mechanism based on the touch and grip patterns of both the user's preferred hand and the user's non-preferred hand, as described herein.
Figure 14:
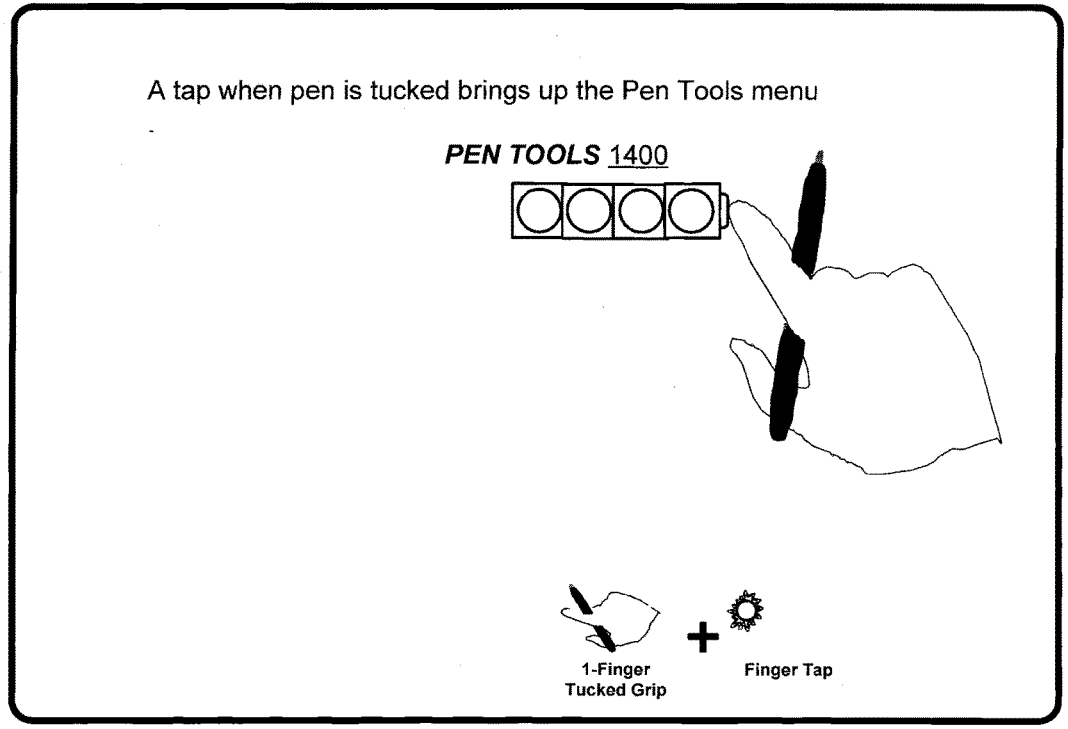
FIG. 14 provides an exemplary illustration of using the pen and computing device sensor correlation technique to provide a pen tool input mechanism based on the touch and grip patterns of both the user's preferred hand and the user's non-preferred hand, as described herein.
Figure 15:
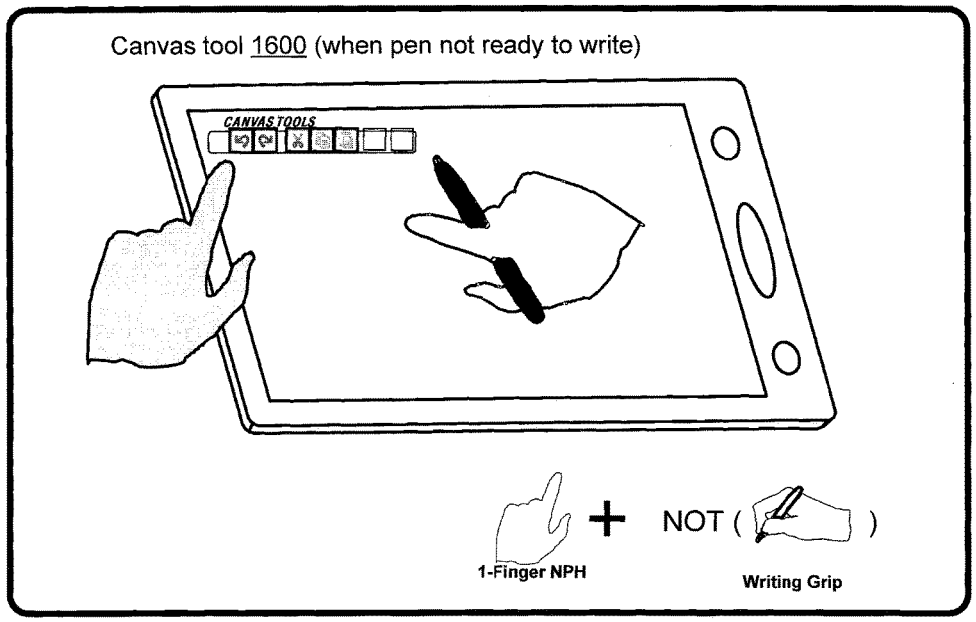
FIG. 15 provides an exemplary illustration of using the pen and computing device sensor correlation technique to provide a canvas tool input mechanism based on the touch and grip patterns of both the user's preferred hand and the user's non-preferred hand, as described herein.

If some implementations of the pen and computing device sensor correlation technique see a two-finger touch without any corresponding bump on the stylus, the implementations instead infer that the user made the touch with their other (nonpreferred) hand, which is not holding the pen. In some implementations, this then triggers the standard two-finger pan and zoom interaction to allow Full Canvas Zoom 1200 (rather than the focus-plus-context Magnifier Tool) as shown in FIG. 12.

In some implementations, the Magnifier/Loupe Tool zooms only the region of the canvas under the circular tool. The Magnifier/Loupe Tool interactively resizes itself according to the spread between the user's two fingers. The user may also touch down a finger on the border of the Magnifier/Loupe Tool to drag it to a new location. A single finger tap, or pen stroke, anywhere outside of the Magnifier/Loupe Tool is dismissed, leaving the canvas undisturbed at its original zoom level.

Note that since some implementations of the pen and computing device sensor correlation technique employ a minimum motion threshold to detect the bump signal, if the user touches their fingers down very lightly the pen may not detect a motion signal sufficient to exceed this threshold. Nonetheless, these thresholds of the pen and computing device sensor correlation technique are sufficient to detect the motions produced when users naturally bring their fingers to the screen with the pen is stowed.

5.1.6 The Drafting Tools

The Drafting Tools (FIG. 13, 1300) capability arose from the observation that users often maintain the Writing grip between bursts of writing activity. For example, during pauses users often rotate the wrist away from the screen, to bring the pen into the Writing—Half Supination pose. Hence, the Writing grip itself represents an interesting context that can be explicitly supported by providing various drafting tools that take into account that the user is holding the pen in a ready-to-write posture.

In some implementations of the pen and computing device sensor correlation technique, the user calls up the Drafting Tools menu explicitly, by a single contact such as touching down a single finger of the non-preferred hand (recognized by a single touch without a corresponding bump signal on the pen). If the pen is held in the Writing grip, this brings up a small palette that offers various pen+touch tool modes, including an Airbrush and a Compass and so forth. In some implementations of the pen and computing device sensor correlation technique the Drafting Tools menu is invoked as soon as the user touches down his finger. In some technique implementations the Airbrush is the initial default mode. In some technique implementations the user can then tap on another tool (such as the Compass) to change modes. In some implementations, all drafting tools are implemented as spring-loaded modes; that is, the mode is maintained only so long as the user holds down his finger. Note also that the Drafting Tools menu, by default, can activate the most recently used tool (mode) when the user initiates contact. This makes repeated use of the same tool at multiple locations more efficient. Implementations of the Airbrush tool, the Compass tool, as well as a Single-Tap Virtual Pen Barrel button are described in more detail below.

Additionally, in some implementations, an "advanced drafting tools" capability can use sensors on the pen and sensors on the touch-sensitive computing device to detect that the sensor pen is held in a writing grip in the user's preferred hand and to detect a two-finger touch gesture such as a pinching motion at the touch-sensitive display of the computing device with the user's non-preferred hand. The pinching motion with the user's non-preferred hand brings up a set of advanced drafting tools when the pen is ready to write. These special tools further support use of the pen that benefits from a second touch. For example, these drafting tools can include a ruler or alignment edge, a French curve or a function to pull a new sheet of paper (with two-finger position and rotation). The user may also move back and forth between the Advanced Drafting Tools and the standard drafting tools by lifting (or putting back down) one of the two fingers; the tool set shown corresponds to the number of fingers placed on the display.

5.1.6.1 Airbrush Tool

One implementation of the Airbrush tool initially shows cursor feedback, as a gray dashed ellipse, of where the airbrush will spray if the user starts the paint flow. The user indicates where the airbrush tool should spray by the position of the (non-preferred hand) finger. This is necessary because (as noted previously) inertial sensing cannot determine the absolute (x,y,z) location of the pen tip above the tablet, only a 3D orientation relative to the tablet. The relative sensing of the pen orientation can be demonstrated by rotating the touch-sensitive computing device (e.g., tablet), rather than the stylus.

In one implementation, the user controls the spray ellipse by changing the azimuth and elevation angles of the pen with respect to the touch-sensitive screen/tablet surface. The user can hold the pen well above the screen, making it easy to angle the pen as desired, unlike a previous exploration of an airbrush-like tool which did not employ the pen tilt angles, likely because it is difficult to reorient the pen while also keeping it within the limited ~15 mm proximity sensing range of the tablet. In some implementations, a separate sensing channel (such as a proximity sensor) may be used to determine the altitude of the pen above the screen, which then determines the size (extent) of the spray ellipse.

In some implementations, the user turns the paint flow on and off by tapping their index finger on the barrel of the pen, which is sensed as further detailed below. When the user activates the spray, the feedback changes to a bold red dashed ellipse to give clear feedback of the shape of the spray being produced. In one prototype, the highly transparent ellipses are "sprayed" onto the canvas. The user may also adjust the size of the ellipse, or the transparency of the spray, by sliding the finger in contact with the pen barrel as if it were a physical slider control. The motion of the finger contact can be sensed and tracked by the pen's grip sensors.

5.1.6.2 Single-Tap Virtual Pen Barrel Button

Implementations of the technique successfully supports single-tap activation of a virtual barrel button by strategically combining some or all of the stylus sensing channels. Implementations of the single-tap virtual pen barrel button described herein use grip sensing data in addition to motion data of the pen.

To identify candidate tap events, some implementations of the pen and touch-sensitive computing device sensor correlation technique look for a bump signal on the barrel of the pen from the finger tap at the same time that a new touch contact appears on a capacitance image map created by using capacitance sensors on the barrel of the pen. However, this alone may not be sufficient to filter out false positives produced by re-gripping the pen, because shifting grips can also produce bump signals coincident with new finger contacts. To filter these out, some implementations of the technique rely on the observation that users hold the pen still in a Writing grip to maintain a stable tripod grasp when they lift the index finger to tap on the barrel (per observation B9). This is advantageous because detection of the Writing grip provides a gate to make sure false detections are unlikely to occur. Various implementations of the technique therefore look at the ongoing accelerometer and gyro signals and compute a simple time-decaying motion signal to determine whether a device is moving or held still. Then only the candidate tap events that occur when the pen is not moving are accepted, which effectively filters out any false contacts. In one working implementation, the pen must remain in a new moving (or not moving) state for at least 100 ms. Otherwise, the pen barrel tap itself can trigger brief activation of a "moving" signal, which of course would thwart recognition of the barrel tap.

5.1.6.3 Compass Tool

The Drafting Tools palette also includes a Compass, which supports a pen+touch mode where the pen is constrained to draw circular arcs centered about the current location of the finger (again of the non-preferred hand).

5.1.7 The Pen Controls

As another example, a single-finger contact such as a tap while the pen is stowed brings up a small in-place palette containing the Pen Controls (FIG. 14, 1400), allowing the user to change modes, or to modify the pen color and stroke thickness, without making a round-trip to a toolbar docked at the edge of the workspace. This example again takes advantage of the bump generated on the pen when the user taps the touch screen from an extension grip, using any single finger to make touch screen contact. The tools appear next to the finger. The user may then interact with the radial menus using either pen or touch, as studies have consistently found that users expect pen and touch to be interchangable for UI controls. Note that in some implementations these or related controls may be activated by either a tap (i.e. a finger-down+finger-up sequence) or by a tap-and-hold (finger-down+maintaining finger contact with the screen). The latter is particularly conducive to spring-loaded modes, which maintained as long as the finger remains in contact with the digitizer.

5.1.8 Canvas Tools

The Canvas Tool (FIG. 15, 1500) uses sensors of the pen and on the touch-sensitive computing device to detect when a user is holding the sensor pen in a non-writing position in the user's preferred hand and to detect when a single contact such as for example a finger tap with the user's non-preferred hand on the touch screen of the computing device. These correlated concurrent actions cause a menu of canvas tools to be displayed on the display of the computing device. For example, this menu of tools could include undo/redo, cut-copy-paste, new page, search and similar commands. Like the pen tools, in some implementations the canvas tools and related tools can be activated by either a tap or tap-and-hold gesture, depending on the implementation.

5.1.9 Touch-Sensitive Computing Device/Tablet Grip Detection

Implementations of the pen and computing device sensor correlation technique use capacitive grip sensing on the back and sides of the touch-sensitive computing device case to detect a number of additional contacts and to determine their contexts.

5.1.9.1 Thumb Menu and Handedness Detection

There are many instances where the user picks up and holds a touch-sensitive computing device (e.g., tablet or other similar device) with both hands, making the pen unavailable. Implementations of the pen and computing device sensor correlation technique use grip to sense which hand the user is holding the touch-sensitive computing device with. Implementations of the pen and computing device sensor correlation technique then use this to summon a Thumb Menu (FIG. 5, 534) at the appropriate side of the touch-sensitive computing device (e.g., tablet), which allows the user to activate various buttons and menus directly with the thumb. If the user grasps the touch-sensitive computing device (e.g., tablet) with a second hand, implementations of the pen and computing device sensor correlation technique leave the Thumb Menu visible at the side where it first appeared. In other implementations, it may be split (or duplicated) across the two thumbs.

If the user is observed grasping the pen while holding the touch-sensitive computing device with one hand, implementations of the pen and computing device sensor correlation technique can immediately infer the user's handedness. The hand holding the pen is inferred to be the preferred hand, and the hand holding the touch-sensitive computing device (e.g., tablet) may be presumed to be not the preferred hand. Some technique implementations can also tell if the pen-holding hand grabs or grips the touch-sensitive computing device (e.g., tablet) by looking for a bump on the pen at the time the user's hand contacts a grip sensor on the touch-sensitive computing device (e.g., tablet).

5.1.9.2 Detecting Unintentional Thumb Contact

In some implementations of the pen and computing device sensor correlation technique when the Thumb Menu first appears, it fades in over a short (e.g., 1.5 second) interval, and likewise if the user lets go of the touch-sensitive computing device it fades out after a short time (e.g., 350 ms). The purpose of this animation feedback is to present the Thumb Menu in a tentative state, so that if the user's thumb strays onto the touch screen while picking up the tablet, the thumb contact can be ignored or otherwise treated as a likely-unintentional input.

Implementations of the pen and computing device sensor correlation technique infer that a thumb represents an unintentional touch if it occurs at the same time as (or soon after) a new hand grip on the corresponding back portion of the tablet case. Some implementations of the pen and computing device sensor correlation technique then detect the thumb as an unintentional contact, and freeze the fade-in of the Thumb Menu if the unintentional thumb contact overlaps it. This feedback indicates to the user that the thumb contact has been recognized, but intercepted to prevent accidental activation of the menu. The user can then intentionally interact with the Thumb Menu, if desired, simply by lifting the thumb and bringing it back down on the menu. The fade-in animation continues as soon as the user lifts his or her thumb. If the user does not place the thumb on the screen when picking up the touch-sensitive computing device, the fade-in also serves as secondary cue that the Thumb Menu is fully ready for use. Since accidental activation mainly tends to occur when the user first grasps the touch-sensitive computing device, after a few seconds elapse it is assumed that any hand contact with the screen was intentional. This therefore illustrates how the detection scheme of implementations of the pen and computing device sensor correlation technique block unintentional touch, while also allowing intentional touches to get through, unlike simple thumb-blocking heuristics which ignore any hand contact near the edge of the screen in certain applications.

5.1.10.3 Handoff: Passing the Pen or the Touch-Sensitive Computing Device to Another User In implementations of the pen and computing device sensor correlation technique passing a touch-sensitive computing device (e.g., a tablet) or a pen to another user is used as a way to offer an alternative, more physical semantic of sharing content with another user. Studies of passing prehension and other user observations indicate that users go through a sequence of specific motions. First they extend the object while holding it approximately level to offer it to the other person, then they maintain their grip until the other person has firmly grasped the object. The person passing the device then lets go, and the other person brings it in closer to their body, often while also orienting the screen to his or her preferred viewing angle. All or parts of this sequence can be sensed to detect passing prehension interactions.

Figure 16:
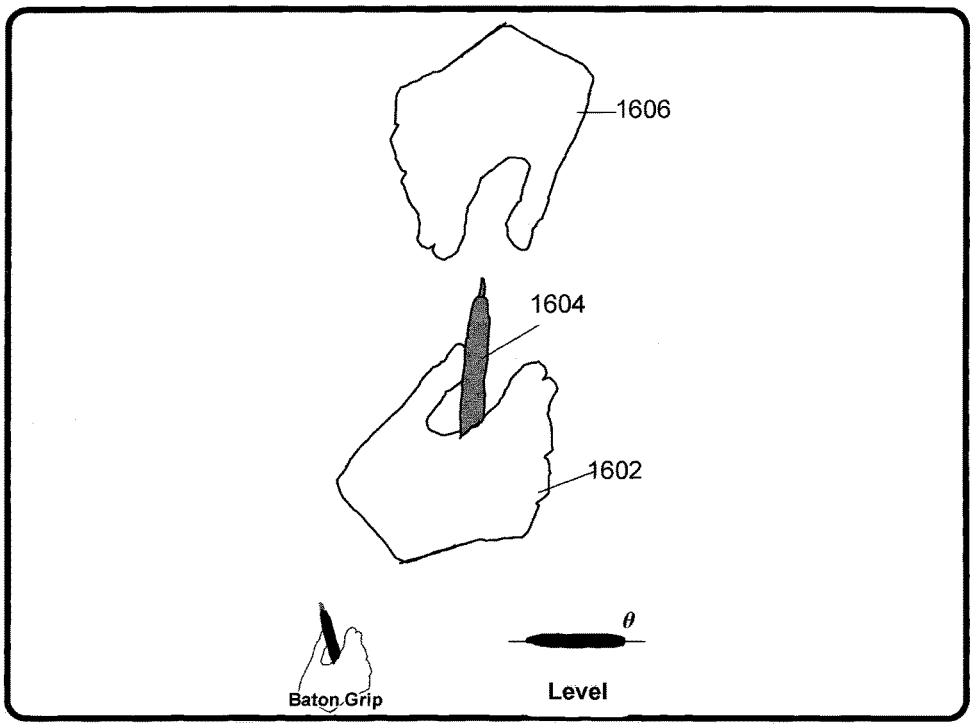
FIG. 16 provides an exemplary illustration of two users passing a touch-sensitive pen between them and initiating context-appropriate capabilities based on the grip patterns of both users on the touch-sensitive pen and the orientation of the pen, as described herein.

For example, FIG. 16 shows a primary user 1602 passing a pen 1604 to a secondary user 1606. The grip of the primary user on the touch-sensitive pen is sensed (e.g., a baton grip). At the same time, or almost the same time, the grip of the secondary user on the touch-sensitive pen is also sensed. The grips of the primary and secondary users on the pen are correlated to determine the context of the grips and to initiate a command in an application executing on the touch-sensitive pen (and/or computing device in communication with the pen). For example, the grip of the secondary user can be determined to represent a handoff of the pen to the secondary user from the primary user. In this case data can be transferred from the primary user to the secondary user via the handoff of the pen. Alternately, one or more capabilities of the touch-sensitive pen can be restricted following the handoff.

Figure 17:
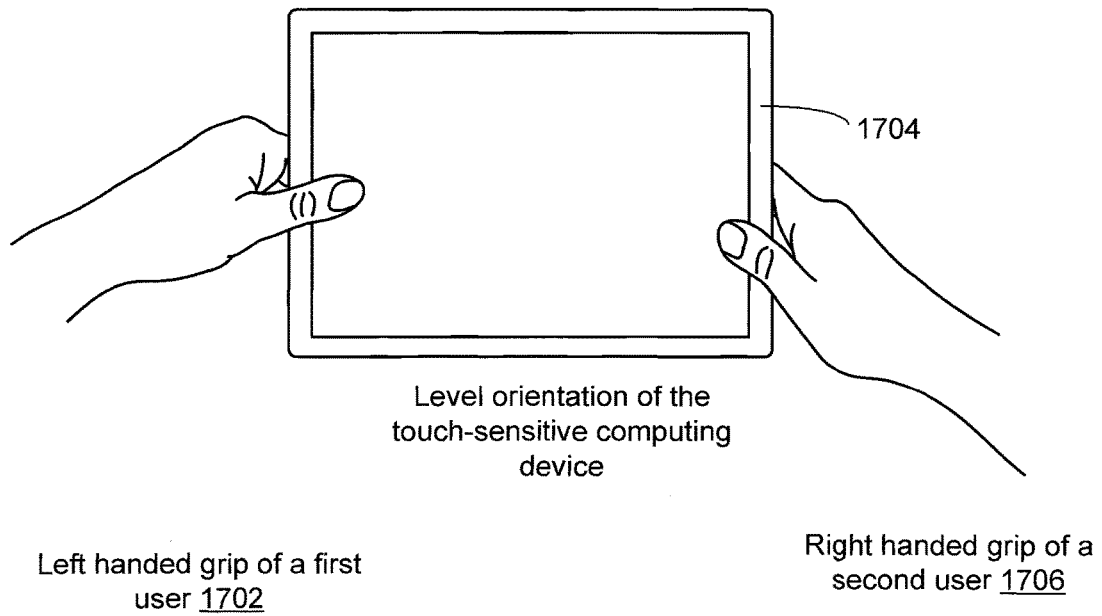
FIG. 17 provides an exemplary illustration of two users passing or sharing a touch-sensitive computing device between them based on the grip patterns of the two users on the touch-sensitive computing device and the orientation of the touch-sensitive computing device, as described herein.

Similarly, FIG. 17 shows a primary user 1702 passing a touch-sensitive computing device 1704 to a secondary user 1706. Some implementations of the pen and computing device sensor correlation technique employ sensors to detect the grips of the two users on the touch-sensitive computing device using the devices's case grip sensing to determine when each user is grasping the device, and the device's orientation to determine if it is level. The detected grips and the orientation of the device (as well as possibly other data) can be used to assign each user a different role with a different set of permissions in using the touch-sensitive computing device. When these conditions are detected in some implementations a special annotation layer peels over the screen, as if a transparency or a sheet of vellum had been dropped over the display. The other user is then free to annotate the content, but not to make digital copies or navigate to other documents or files. This is a very different and much more limited form of sharing than the digital transfer of information supported by other cross-device information transfer techniques. Implementations of the pen and computing device sensor correlation technique do not trigger Tablet Handoff when a single user holds the display up with two hands; during such interactions, users tend to angle the tablet towards themselves, and thus it is not level. In a similar manner, interactions where the device is perfectly flat on a desk can be detected such that users will not unintentionally trigger Tablet Handoff if they happen to touch or hold their device with both hands.

5.2 History Prior to the Correlation with Bump on Sensors.

Some implementations of the pen and computing device sensor correlation technique analyze past data of sensors (obtained, for example, by constantly recording sensor data) on the touch-sensitive pen and/or the touch-sensitive computing device. This data can be correlated, for example, with sensor data taken at the time of a bump that is associated with touch down of the pen to confirm or reinforce that the touch was correlated with the movement of the pen. Implementations of the technique that use past correlation data in addition to present correlation data can be more robust than those that do not. For example, there may be an acceleration/declaration pattern associated with the pen a little bit before sensor data associated with a person putting down his or her hand to write that is recognized at the time of the bump detection to confirm that the contact is a palm and not by chance a touch down with the non-dominant hand while the pen is being moved at the same time.

6.0 Exemplary System Hardware:

In a prototype implementation, to support the range of context-sensing techniques envisioned, custom hardware was designed to augment the pen and touch-sensitive computing device with inertial sensors and capacitive grip sensing, as well as custom software/firmware to handle simultaneous pen+touch events from the touch screen. The description of the following exemplary prototype hardware and software/firmware is not meant to be limiting but is provided to show how implementations discussed herein could be implemented. Those with ordinary skill in the art will realize that many other implementations are possible.

6.1. Pen Hardware Design

In one exemplary working implementation, a flexible capacitive grid consisting of 7×30 sensing elements covers the entire barrel of a pen, which was wrapped in heat-shrink tubing to protect the sensors and to provide a smooth and easy-to-grip cylindrical surface for sensing. The interior of the pen consists of a 3D-printed case that holds a miniature electromagnetic pen, a 4 AAAA battery, and custom circuitry. For inertial sensing a gyroscope as well as an accelerometer/magnetometer module was used. For capacitive sensing a touch controller was employed. The pen streams all data to a host computer using a transceiver operating at 2 Mbps. A microcontroller runs the firmware.

In this particular implementation, all inertial sensor data is streamed off the pen at 130 Hz, and the 7×30 capacitance map at 30 Hz. The resulting pen is 19 cm long with a 13 mm external diameter.

6.2 Touch-Sensitive Computing Device/Tablet Hardware Design

The touch-sensitive computing device in this exemplary prototype system is a tablet computer. The tablet case covers the entire back surface and sides of the tablet. The rigid case is constructed from printed circuit boards consisting of 44×26 capacitive sensing elements. There is a small insensitive area (in the middle of the case on the back side) where the integrated circuits are mounted. The case includes the same sensor components as the pen, except there are four touch controllers for different parts of the capacitive grid. The tablet sensor data is streamed via USB, with the tablet's inertial sensors sampled at 100 Hz and the tablet's 44×26 capacitance map sampled at 25 Hz.

6.3 Simultaneous Pen and Touch from the Touch Screen

Multi-touch and pen events were handled by intercepting them directly from a Human Interface Device (HID) controller. Using this approach a Samsung Corporation Series 7 Slate was used for the prototype that can report up to 8 touch contacts simultaneously with pen input.

6.4 Software/Firmware Design

Some technique implementations aggregate and time-stamp the pen and tablet sensor data on an external PC for processing, and then transmit relevant input events to the tablet for presentation in a user interface. Furthermore, some technique implementations compute grip recognition on the external PC. As such, one implementation consists of a distributed system with four cooperating components: the touch-sensitive pen, the tablet case, the tablet itself, and the external PC. It should be noted, however, that aggregating and time-stamping the sensor data, as well as grip recognition, can be performed on the tablet computer thereby obviating the need for the standalone personal computer (PC). The case can be directly integrated into the touch-sensitive computing device. In some implementations, time-stamped data from all the distributed event streams are queued up in synchronized buffers. Some technique implementations then handle events from these buffers up until the latest time-stamp for which all events are available. In other implementations, some events may be dispatched in real-time but then subsequently modified if future event samples arrive from other sources that would alter their interpretation. This can be achieved by delaying feedback, displaying tentative feedback, or undoing speculative actions in end-user applications.

6.5 Inertial Sensor Fusion

Some technique implementations combine accelerometer, gyro, and magnetometer sensor inputs using a direction cosine matrix algorithm. This produces stable yaw, pitch, and roll values in an east-north-up Earth coordinate frame. This is used to derive the pen orientation in a consistent reference frame relative to the tablet.

6.6 Pen Grip Classification

The prototype implementation recognizes four distinct grips: Writing, Tuck, Palm, and No Grip (for when the pen is not held). Per observed behavior B4 (Grip vs. Pose), the grip recognition considers the pattern of hand contact (capacitive grip sensing) as well as the pose (orientation) of the stylus. The prototype implementation of the system processes the incoming data to extract salient features and then trains a multi-class classifier to extract the pen grips. Technique implementations perform a multi-class classification of the pen grip patterns by using a set of one-vs-all learners, where each learner is a Support Vector Machine (SVM) classifier. The result is a probability distribution over all four grips.

Technique implementations select features for grip classification that take into account unique considerations of the pen form-factor. In particular, since the pen is symmetrical (cylindrical) along the axis of the pen barrel, the sensed grips are agnostic to the roll angle of the pen. Similarly, whether the user grips the pen lower or higher on the barrel, or the size of his hand, should not affect the grip classification. Thus some implementations of the system compute a normalized image invariant with respect to both grip height and roll angle. From the raw 7×30 capacitance map, the system fits the non-zero capacitance values into a 7×10 normalized image. The capacitance map is shifted in the y-dimension so that the first row of lit (non-zero capacitance) pixels corresponds to the bottom of the normalized image, and then scale the non-zero capacitance pixels to fit in the 10 rows of the normalized image. The features employed for grip classification therefore include the pen yaw and pitch angles, the normalized grip image, as well as the normalized grip histogram in the x and y dimensions. Technique implementations also include features for the number of lit (non-zero) pixels, and the pixel sum of all 7×30 capacitance values from the raw capacitance map.

6.6 Grip Training Dataset Collection

In one implementation, nine right-handed participants (4 female), all of whom had prior exposure to pen and tablet use, were used to generate a grip training dataset. Users were led through a script illustrating specific grips and actions to perform in each grip. These included stowing the pen while using touch (per observed behavior B1) from both the Tuck and Palm grips (behavior B2). Different sequences of tasks were also included to capture various common transitions between grips (behavior B3). Users were led through the full range of supination for each grip (behavior B4) which included transitions between Writing and the single-finger and two-finger extension grips (behavior B5), with articulation of direct-manipulation gestures such as tapping, dragging, and pinching. However, no particular tripod grip to use was specified, but rather users were allowed to hold the pen naturally so that the dataset would capture cross-user variations in Writing grips (per behavior B6). The data collection lasted approximately 15 minutes per user, with a total of 1200 samples for each user, per grip, yielding a total training dataset of 1200×3 grips×9 users=32400 samples.

6.6 Pen Grip Recognition Accuracy

A 10-fold cross-validation using the collected grip training dataset yielded an overall accuracy of 88% for a user-independent model. A separate check with nine additional right-handed users was conducted, none of whom had contributed data to the training dataset. This yielded user-independent grip recognition accuracy of 93% for the Writing grip, 93% for the Tuck grip, and 77% for the Palm grip. The relatively low recognition rate for the Palm grip appeared to stem from several users' tendency to hold the pen very lightly in this grip, resulting in a somewhat inconsistent pattern of contact sensed by the capacitive grip array. However, the system was still able to distinguish Writing vs. non-writing grips (i.e. Tuck or Palm) with 97% accuracy. Since most interaction techniques do not depend on any distinction between the Tuck versus Palm grips, this user-independent grip model, which works well enough even without collecting training data for newly-encountered users, was used.

Figure 18:
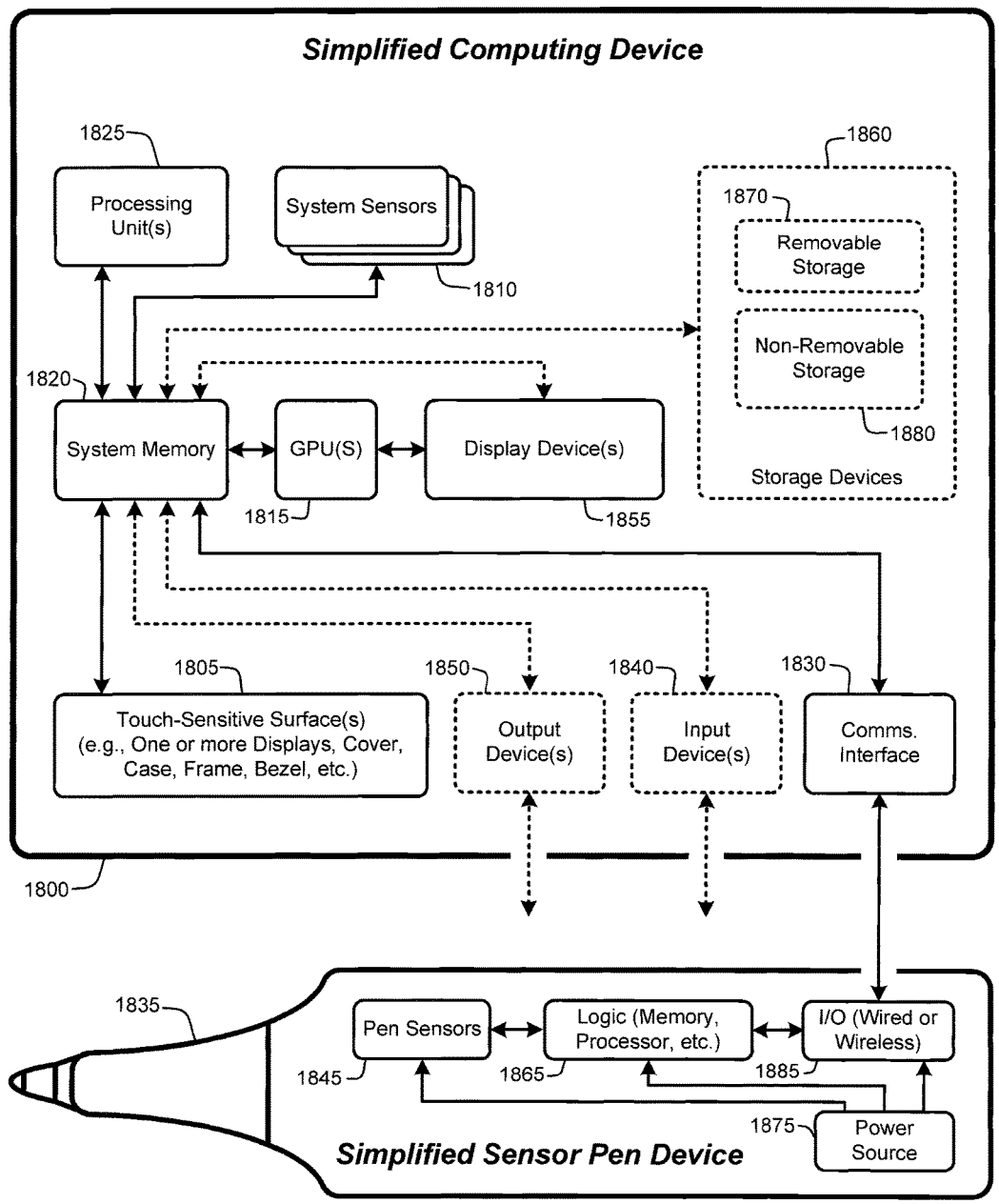
FIG. 18 is a general system diagram depicting a simplified general-purpose computing device having simplified computing and I/O capabilities, in combination with a touch-sensitive pen having various sensors, power and communications capabilities, for use in implementing various implementations of the pen and computing device sensor correlation technique, as described herein.

7.0 Exemplary Operating Environments:

Implementations of the pen and computing device sensor correlation technique described herein are operational within numerous types of general purpose or special purpose computing system environments or configurations. FIG. 18 illustrates a simplified example of a general-purpose computer system in combination with a pen or pen enhanced with various sensors with which various implementations and elements of the pen and computing device sensor correlation technique, as described herein, may be implemented. It should be noted that any boxes that are represented by broken or dashed lines in FIG. 18 represent alternate implementations of the simplified computing device and sensor pen, and that any or all of these alternate implementations, as described below, may be used in combination with other alternate implementations that are described throughout this document.

For example, FIG. 18 shows a general system diagram showing a simplified touch-sensitive computing device 1800. In general, such touch-sensitive computing devices 1800 have one or more touch-sensitive surfaces 1805 or regions (e.g., touch screen, touch sensitive bezel or case, sensors for detection of hover-type inputs, optical touch sensors, etc.). Examples of touch-sensitive computing devices 1800 include, but are not limited to, touch-sensitive display devices connected to a computing device, touch-sensitive phone devices, touch-sensitive media players, touch-sensitive e-readers, notebooks, netbooks, booklets (dual-screen), tablet type computers, or any other device having one or more touch-sensitive surfaces or input modalities.

To allow a device to implement the pen and computing device sensor correlation technique, the computing device 1800 should have a sufficient computational capability and system memory to enable basic computational operations. In addition, the computing device 1800 may include one or more sensors 1810, including, but not limited to, accelerometers, gyroscopes, magnetometer, finger print detectors, cameras including depth cameras, capacitive sensors, proximity sensors, microphones, multi-spectral sensors, etc. As illustrated by FIG. 18, the computational capability is generally illustrated by one or more processing unit(s) 1825, and may also include one or more GPUs 1815, either or both in communication with system memory 1820. Note that the processing unit(s) 1825 of the computing device 1800 of may be specialized microprocessors, such as a DSP, a VLIW, or other micro-controller, or can be conventional CPUs having one or more processing cores, including specialized GPU-based cores in a multi-core CPU.

In addition, the computing device 1800 may also include other components, such as, for example, a communications interface 1830 for receiving communications from sensor pen device 1835. The computing device 1800 may also include one or more conventional computer input devices 1840 or combinations of such devices (e.g., pointing devices, keyboards, audio input devices, voice or speech-based input and control devices, video input devices, haptic input devices, touch input devices, devices for receiving wired or wireless data transmissions, etc.). The computing device 1800 may also include other optional components, such as, for example, one or more conventional computer output devices 1850 (e.g., display device(s) 1855, audio output devices, video output devices, devices for transmitting wired or wireless data transmissions, etc.). Note that typical communications interfaces 1830, input devices 1840, output devices 1850, and storage devices 1860 for general-purpose computers are well known to those skilled in the art, and will not be described in detail herein.

The computing device 1800 may also include a variety of computer readable media. Computer readable media can be any available media that can be accessed by computer device 1800 via storage devices 1860 and includes both volatile and nonvolatile media that is either removable 1870 and/or non-removable 1880, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various implementations of the pen and computing device sensor correlation technique described herein, or portions thereof, may be stored, received, transmitted, and/or read from any desired combination of computer or machine readable media or storage devices and communication media in the form of computer executable instructions and/or other data structures.

Finally, the pen and computing device sensor correlation technique described herein may be further described in the general context of computer-executable instructions, such as program modules, being executed by a computing device. Generally, program modules include routines, programs, objects, components, data structures, etc., that perform particular tasks or implement particular abstract data types. The implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The sensor pen device 1835 illustrated by FIG. 18 shows a simplified version of a pen or pen augmented with pen sensors 1845, logic 1865, a power source 1875 (e.g., a battery), and basic I/O capabilities 1885. As discussed above, examples of pen sensors 1845 for use with the sensor pen device 1835 include, but are not limited to, inertial sensors, cameras including depth cameras, proximity sensors, finger print sensors, galvanic skin response sensors, accelerometers, pressure sensors, grip sensors, near-field communication sensors, RFID tags and/or sensors, temperature sensors, microphones, magnetometers, capacitive sensors, gyroscopes, etc.

In general, the logic 1865 of the sensor pen device 1835 is similar to the computational capabilities of computing device 1800, but is generally less powerful in terms of computational speed, memory, etc. However, the sensor pen device 1835 can be constructed with sufficient logic 1865 such that it can be considered a standalone capable computational device.

The power source 1875 of the sensor pen device 1835 is implemented in various form factors, including, but not limited to, replaceable batteries, rechargeable batteries, capacitive energy storage devices, fuel cells, etc. Finally, the I/O 1885 of the sensor pen device 1835 provides conventional wired or wireless communications capabilities that allow the sensor pen device to communicate sensor data and/or other information to the computing device 1800.

The foregoing description of the pen and computing device sensor correlation technique has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the pen and computing device sensor correlation technique. For example, various devices used to enable some of the many implementations of the pen and computing device sensor correlation technique described herein include pens, pointers, pen type input devices. However, the functionality described herein may be implemented in any desired form factor, e.g., phone, wand, staff, ball racquet, toy sword, etc., for use with various gaming devices, gaming consoles, or other computing devices. Further, the sensor pens described herein are adapted to incorporate a power supply and various combinations of sensors including, but not limited to inertial sensors, cameras including depth cameras, accelerometers, pressure sensors, grip sensors, near-field communication sensors, RFID tags and/or sensors, temperature sensors, microphones, magnetometers, capacitive sensors, gyroscopes, etc., in combination with various wireless communications capabilities for interfacing with various computing devices. Note that any or all of these sensors may be multi-axis or multi-position sensors (e.g., 3-axis accelerometers, gyroscopes, and magnetometers). In addition, in various implementations, the sensor pens described herein have been further adapted to incorporate memory and/or computing capabilities that allow the sensor pens to act in combination or cooperation with other computing devices, other sensor pens, or even as a standalone computing device.

While the pen and computing device sensor correlation technique senses actual touch to a sensor pen and a touch-sensitive computing device, it may also be employed with virtual touch inputs. Virtual touch inputs relative to projected displays, electronic whiteboards, or other surfaces or objects are treated by the pen and computing device sensor correlation technique in the same manner as actual touch inputs on a touch-sensitive surface. Such virtual touch inputs are detected using conventional techniques such as, for example, using cameras or other imaging technologies to track user finger movement relative to a projected image, relative to text on an electronic whiteboard, relative to physical objects, etc.

In addition, it should be understood that the pen and computing device sensor correlation technique is operable with a wide variety of touch and flex-sensitive materials for determining or sensing touch or pressure. For example, one touch-sensing technology adapted for use by the pen and computing device sensor correlation technique determines touch or pressure by evaluating a light source relative to some definite deformation of a touched surface to sense contact. Also, it should be noted that sensor pens, as discussed herein, may include multiple types of touch and/or pressure sensing substrates. For example, sensor pens may be both touch-sensitive and/or pressure sensitive using any combination of sensors, such as, for example, capacitive sensors, pressure sensors, flex- or deformation-based sensors, depth sensors, etc.

It is intended that the scope of the disclosure be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for initiating user interface actions, comprising using a computer for:
   determining a user's preferred hand and non-preferred hand from sensor inputs, wherein the user's preferred hand is determined by:
   sensing sensor signals representing a bump in a motion of a touch-sensitive pen when a contact is made with a touch-sensitive computing device; and
   correlating sensor signals representing the bump in the touch-sensitive pen's motion with signals representing a motion of the touch-sensitive computing device to determine the user's preferred hand; and
   initiating a user interface action based on the determination of the user's preferred hand and non-preferred hand.

2. The computer-implemented process of claim 1, further comprising determining the user's preferred hand by:
   sensing the sensor signals representing the bump in a motion of the touch-sensitive pen when the contact is made with the touch-sensitive computing device; and
   correlating the sensor signals representing the bump in the touch-sensitive pen's motion with the sensor signals representing the motion of the touch-sensitive computing device to determine that the hand holding the touch-sensitive pen is the preferred hand.

3. The computer-implemented process of claim 1 further comprising:
   correlating the sensor signals representing the touch-sensitive computing device motion with touch patterns on the touch-sensitive computing device; and
   using the correlated motion and touch patterns on the touch-sensitive computing device to suppress accidental screen content rotation on a display of the touch-sensitive computing device.

4. The computer-implemented process of claim 1 wherein the user interface action is displaying a menu on a display of the touch-sensitive computing device.

5. The computer-implemented process of claim 4 wherein the menu displayed is dependent on whether the user's preferred hand or non-preferred hand is touching the touch-sensitive computing device.

6. The computer-implemented process of claim 1, further comprising:
   determining whether the user is making a gesture with the user's preferred hand or non-preferred hand.

7. The computer-implemented process of claim 1, further comprising:
   determining grip patterns on the touch-sensitive pen and grip patterns on the touch-sensitive computing device;
   using the grip patterns, determining whether the user is making a gesture with a bare hand or whether the user is making a gesture with a hand holding the touch-sensitive pen.

8. The computer-implemented process of claim 7, further comprising:
   determining that the touch-sensitive pen is held in a stowed position in the user's preferred hand;
   detecting a contact from the user's preferred hand on a display of the touch-sensitive computing device; and
   displaying context-specific tools in response to the contact.

9. The computer-implemented process of claim 7, further comprising:
   determining that the touch-sensitive pen is held in the user's preferred hand in a grip indicating that the touch-sensitive pen is not in a position to write;
   detecting a contact from the user's non-preferred hand on a display of the touch-sensitive computing device; and
   displaying context-specific tools in response to the contact.

10. The computer-implemented process of claim 7, further comprising:
    determining that the touch-sensitive pen is held in a grip indicating that the touch-sensitive pen is in a position to write in the user's preferred hand;
    detecting a contact from the user's non-preferred hand on a display of the touch-sensitive computing device; and
    displaying context-specific tools in response to the contact.

11. The computer-implemented process of claim 7, further comprising:
    determining that the touch-sensitive pen is held in a grip indicating that the touch-sensitive pen is in a position to write in the user's preferred hand;
    detecting a multi-finger touch gesture from the user's non-preferred hand on the display of the touch-sensitive computing device; and
    displaying context-specific tools in response to the multi-finger touch gesture.

12. The computer-implemented process of claim 1, further comprising:
    determining which hand a user is holding the touch-sensitive computing device with; and
    displaying a menu in a location on the screen of the touch-sensitive computing device that can be activated by the user with the thumb of the hand holding the touch-sensitive computing device.

13. The computer-implemented process of claim 1, wherein one or more of the signals represent a finger print of a user which is used to identify the user.

14. The computer-implemented process of claim 1, further comprising using historical signal data to improve the correlation of the signals.

15. A computer-implemented process for initiating user interface actions, comprising using a computer for:
    determining a user's preferred hand and non-preferred hand from sensor inputs, wherein the user's preferred hand is determined by:
    sensing sensor signals representing a bump in a motion of a first touch-sensitive device when a contact is made with a second touch-sensitive device; and
    correlating sensor signals representing the bump in the first touch-sensitive device's motion with signals representing a motion of the second touch-sensitive device to determine the user's preferred hand; and
    using the determination of the user's preferred hand and non-preferred hand in an application.

16. The computer-implemented process of claim 15 wherein the determination of the user preferred hand and non-preferred hand is used to initiate a context-appropriate command using the application.

17. The computer-implemented process of claim 16, wherein the context-appropriate action is enabling context-appropriate functionality on the first touch-sensitive computing device or the second touch-sensitive computing device.

18. The computer-implemented process of claim 16, wherein the determination of the user's preferred hand or non-preferred hand is used to detect unintentional contact with either the first touch-sensitive computing device or the second touch-sensitive computing device.

19. The computer-implemented process of claim 16, wherein using the determination of the user's preferred hand and non-preferred hand is used in determining a user's grip on either the first touch-sensitive computing device or the second touch-sensitive computing device.

* * * * *